US012571873B2

(12) United States Patent
Jung et al.

(10) Patent No.: US 12,571,873 B2
(45) Date of Patent: Mar. 10, 2026

(54) ANGLE OF ARRIVAL DATA ACQUISITION METHOD AND ELECTRONIC DEVICE SUPPORTING SAME

(71) Applicant: SAMSUNG ELECTRONICS CO., LTD., Suwon-si (KR)

(72) Inventors: Hyukjin Jung, Suwon-si (KR); Sunghwan Ko, Suwon-si (KR); Youngsuk Yoo, Suwon-si (KR); Moonseok Kang, Suwon-si (KR); Kibong Lee, Suwon-si (KR); Woosup Lee, Suwon-si (KR); Kunyoung Choi, Suwon-si (KR); Hyunsuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 358 days.

(21) Appl. No.: 18/105,625

(22) Filed: Feb. 3, 2023

(65) Prior Publication Data

US 2023/0176171 A1     Jun. 8, 2023

Related U.S. Application Data

(63) Continuation of application No. PCT/KR2021/010087, filed on Aug. 2, 2021.

(30) Foreign Application Priority Data

Aug. 3, 2020 (KR) ........................ 10-2020-0096976

(51) Int. Cl.
*G01S 5/02* (2010.01)
*G01S 3/48* (2006.01)
*G01S 5/00* (2006.01)

(52) U.S. Cl.
CPC .............. *G01S 5/0247* (2013.01); *G01S 3/48* (2013.01); *G01S 5/0027* (2013.01)

(58) Field of Classification Search
None
See application file for complete search history.

(56) References Cited

U.S. PATENT DOCUMENTS 10,088,548 B2 * 10/2018 Pandey ................. G01S 5/0247
10,254,381 B2    4/2019 Sen et al.
(Continued)

FOREIGN PATENT DOCUMENTS

CN      106919171 B      6/2020
JP      2004064741 A      2/2004
(Continued)

OTHER PUBLICATIONS

Written Opinion (PCT/ISA/237) issued Dec. 1, 2021 from the International Searching Authority to International Application No. PCT/KR2021/010087.

(Continued)

*Primary Examiner* — Whitney Moore
(74) *Attorney, Agent, or Firm* — Sughrue Mion, PLLC

(57) ABSTRACT

An electronic device includes a processor configured to: receive a Radio Frequency (RF) signal of a designated frequency band from an external electronic device by using at least two antennas among the multiple antennas; acquire first angle-of-arrival data of the RF signal, based on at least a part of the RF signal; determine a posture of the electronic device based on tilt information of the electronic device provided from a sensor module; based on the electronic device that is determined to be tilted in the first direction or the second direction; identify a compensation value corresponding to tilt information of the electronic device; acquire second angle-of-arrival data by applying the compensation (Continued)

value to the first angle-of-arrival data; and determine a location of the external electronic device based on the second angle-of-arrival data.

20 Claims, 16 Drawing Sheets

(56) References Cited

U.S. PATENT DOCUMENTS

| | | | |
|---|---|---|---|
| 11,320,509 | B2 | 5/2022 | Ertan et al. |
| 2011/0018766 | A1 | 1/2011 | Steer et al. |
| 2011/0090113 | A1 | 4/2011 | Fenton |
| 2012/0064841 | A1 | 3/2012 | Husted et al. |
| 2013/0017836 | A1 | 1/2013 | Chang et al. |
| 2013/0275077 | A1 | 10/2013 | Kim et al. |
| 2013/0275873 | A1 | 10/2013 | Shaw et al. |
| 2014/0269389 | A1 | 9/2014 | Bukkfejes et al. |
| 2016/0033616 | A1 | 2/2016 | Sen et al. |
| 2016/0363660 | A1 | 12/2016 | Gudim et al. |
| 2016/0370450 | A1 | 12/2016 | Thorn et al. |
| 2017/0134900 | A1* | 5/2017 | Malik ................... H04L 1/0086 |
| 2017/0195834 | A1 | 7/2017 | Na et al. |
| 2019/0265367 | A1* | 8/2019 | Silverman ................ G01S 5/04 |
| 2019/0317177 | A1 | 10/2019 | Ertan et al. |

FOREIGN PATENT DOCUMENTS

| | | |
|---|---|---|
| JP | 2017508978 A | 3/2017 |
| JP | 6387194 B2 | 9/2018 |
| KR | 1020110009063 A | 1/2011 |
| KR | 1020130009314 A | 1/2013 |
| KR | 1020150131001 A | 11/2015 |
| KR | 1020160014107 A | 2/2016 |
| KR | 1020160136131 A | 11/2016 |
| KR | 102350199 B1 | 1/2022 |

OTHER PUBLICATIONS

International Search Report (PCT/ISA/210) issued Dec. 1, 2021 from the International Searching Authority to International Application No. PCT/KR2021/010087.
Communication issued Feb. 3, 2026 by the Korean Ministry of Intellectual Property for KR Patent Application No. 10-2020-0096976.

* cited by examiner (A)

(B)

(C)

(A)                                        (B)

ANGLE OF ARRIVAL DATA ACQUISITION METHOD AND ELECTRONIC DEVICE SUPPORTING SAME

CROSS-REFERENCE TO RELATED APPLICATIONS

This application is a by-pass continuation application of International Application No. PCT/KR2021/010087, filed on Aug. 2, 2021, which based on and claims priority to Korean Patent Application No. 10-2020-0096976, filed on Aug. 3, 2020, in the Korean Intellectual Property Office, the disclosures of which are incorporated by reference herein in their entireties.

BACKGROUND

1. Field

One or more embodiments disclosed herein are related to methods for acquiring angle-of-arrival data and an electronic device for supporting the same.

2. Description of Related Art

An electronic device may perform radio positioning for an external electronic device by using multiple antennas (for example, supporting ultra-wideband communication), and may control a function of the external electronic device, based on the location of the external electronic device identified through the radio positioning, or provide a designated location-based service to the external electronic device.

In a radio positioning operation for an external electronic device, an electronic device may use angle-of-arrival data of a Radio Frequency (RF) signal received from the external electronic device. When the electronic device has a tilted posture in a specific direction according to the state of a user's gripping of the electronic device or the mounted state of the electronic device, a deviation due to the posture of the electronic device may occur in the angle-of-arrival data of the RF signal received from the external electronic device even if the electronic device and the external electronic device have a fixed position in which the same are matched with each other at 0 degrees.

One or more embodiments disclosed herein may provide methods for acquiring angle-of-arrival data and may provide an electronic device for supporting the same. At least a part of angle-of-arrival data of an RF signal received from an external electronic device may be corrected based on the posture of the electronic device.

SUMMARY

According to an aspect of the disclosure, an electronic device includes a housing that includes a first surface facing a first direction, a second surface facing a second direction opposite to the first direction, and a third surface facing a third direction perpendicular to the first direction or the second direction and surrounding a space between the first surface and the second surface. The electronic device further includes: a sensor module disposed in an inner space of the housing; a memory disposed in the inner space of the housing; multiple antennas disposed in the inner space of the housing; a wireless communication module disposed in the inner space of the housing and electrically connected to the multiple antennas; and a processor electrically connected to the sensor module, the memory, the multiple antennas, and the wireless communication module. The processor is configured to: receive a Radio Frequency (RF) signal of a designated frequency band from an external electronic device by using at least two antennas among the multiple antennas; acquire first angle-of-arrival data of the RF signal, based on at least a part of the RF signal; determine a posture of the electronic device based on tilt information of the electronic device provided from the sensor module. Based on the electronic device that is determined to be tilted in the first direction or the second direction, the processor is also configured to: identify a compensation value corresponding to tilt information of the electronic device stored in the memory; acquire second angle-of-arrival data by applying the compensation value to the first angle-of-arrival data; and determine a location of the external electronic device based on the second angle-of-arrival data.

According to another aspect of the disclosure, a method for acquiring angle-of-arrival data by an electronic device, includes: receiving an RF signal of a designated frequency band from an external electronic device by using at least two antennas among multiple antennas; acquiring first angle-of-arrival data of the RF signal, based on at least a part of the RF signal; determining a posture of the electronic device based on tilt information of the electronic device provided from a sensor module; identifying a compensation value corresponding to tilt information of the electronic device in response to determining that the electronic device is tilted in a first direction faced by a front surface of the electronic device or a second direction faced by a rear surface of the electronic device, the compensation value being stored in a memory; acquiring second angle-of-arrival data by applying the compensation value to the first angle-of-arrival data; and determining a location of the external electronic device based on the acquired second angle-of-arrival data.

According to another aspect of the disclosure, an electronic device includes a housing including a first surface facing a first direction, a second surface facing a second direction opposite to the first direction, and a third surface facing a third direction perpendicular to the first direction or the second direction and surrounding a space between the first surface and the second surface. The electronic device also includes: a sensor module disposed in an inner space of the housing; a memory disposed in the inner space of the housing; multiple antennas disposed in the inner space of the housing; a wireless communication module disposed in the inner space of the housing and electrically connected to the multiple antennas; and a processor electrically connected to the sensor module, the memory, the multiple antennas, and the wireless communication module. The processor is configured to: receive a RF signal of a designated frequency band from an external electronic device by using at least two antennas among the multiple antennas; determine a posture of the electronic device based on tilt information of the electronic device provided from the sensor module. Based on the electronic device that is determined to be tilted in the third direction, the processor is also configured to: identify a first separation distance between the at least two antennas; acquire angle-of-arrival data of the RF signal based on at least a part of the first separation distance and the RF signal; determine a location of the external electronic device based on the angle-of-arrival data.

According to one or more embodiments, at least a part of angle-of-arrival data of an RF signal received from an external electronic device may be corrected based on a posture of the electronic device, thus facilitating acquisition of highly reliable angle-of-arrival data and improvement of precision of radio positioning. In addition to this, various effects identified directly or indirectly herein may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

In describing the drawings, the same reference numerals may be given to the same or corresponding elements.

DETAILED DESCRIPTION

It should be appreciated that various embodiments of the present disclosure and the terms used therein are not intended to limit the technological features set forth herein to particular embodiments and include various changes, equivalents, or replacements for a corresponding embodiment.

Figure 1:
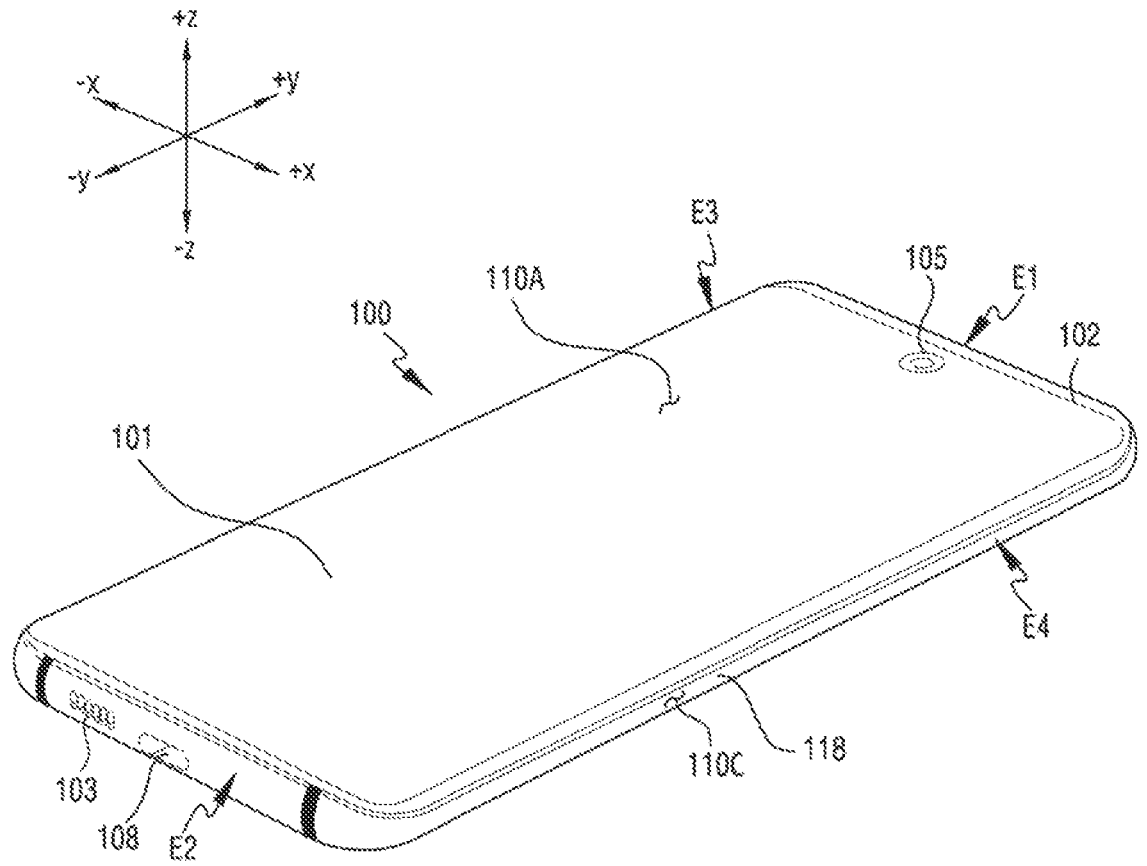
FIG. 1 illustrates the front surface of an electronic device according to an embodiment.
Figure 2:
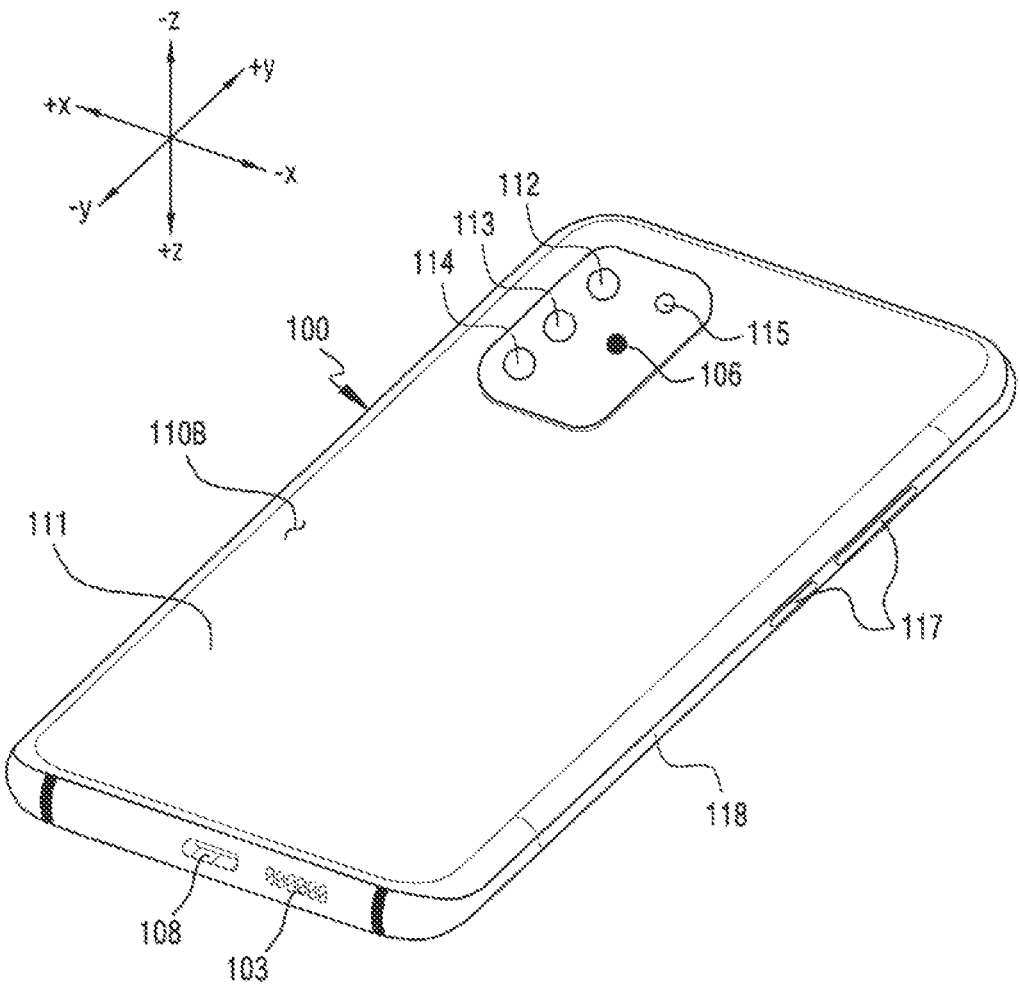
FIG. 2 illustrates the rear surface of an electronic device according to an embodiment.

FIG. 1 illustrates the front surface of an electronic device according to an embodiment, and FIG. 2 illustrates the rear surface of an electronic device according to an embodiment.

In FIGS. 1 and 2, an electronic device 100 according to an embodiment may include a housing that includes a first surface 110A (or the front surface) facing a first direction (e.g., the +Z direction), a second surface 110B (or the rear surface) facing a second direction (e.g., the −Z direction), and a third surface 110C (or the side surface) facing a third direction (e.g., the +X direction, the −X direction, the +Y direction, or the −Y direction) and surrounding the space between the first surface 110A and the second surface 110B. In one or more embodiments, the housing may refer to a structure forming some of the first surface 110A, the second surface 110B, and the third surface 110C.

According to an embodiment, the first surface 110A may be formed by a front plate 102 (e.g., a polymer plate or a glass plate including various coating layers), at least a portion of which is substantially transparent. In one or more embodiments, the front plate 102 may include a curved portion, which seamlessly extends from the first surface 110A toward a rear plate 111, on at least one side edge portion.

According to an embodiment, the second surface 110B may be formed by the rear plate 111, at least a portion of which is substantially opaque. The rear plate 111 may be formed of, for example, coated or colored glass, ceramic, polymer, metal (e.g., aluminum, Stainless Steel (STS), or magnesium), or a combination of at least two of the foregoing materials. In one or more embodiments, the rear plate 111 may include a curved portion, which seamlessly extends from the second surface 110B toward the front plate 102, on at least one end.

According to an embodiment, the third surface 110C may be coupled to the front plate 102 and the rear plate 111, and may be formed by a lateral member 118 (or a bracket) including at least one of metal and polymer. In one or more embodiments, the rear plate 111 and the lateral member 118 may be integrally formed, and may include the same material (e.g., a metal material such as aluminum).

According to an embodiment, the electronic device 100 may include at least one among a display 101, an audio module 103, at least one camera module 105, 112, 113, 114, and/or 115, a flash 106, key input devices 117, and a connector hole 108. In one or more embodiments, in the electronic device 100 at least one of the above-described elements (e.g., the key input devices 117) may be omitted, or other components may be additionally included. For example, the electronic device 100 may additionally include a sensor module, and the sensor module may include at least one among an optical sensor, an ultrasonic sensor, and a capacitive sensor.

In an embodiment, the sensor module may be disposed on at least one of the rear surface of a screen display area of the display 101 (e.g., an area of the display 101 viewed through the front plate 102) and a peripheral area of the display 101. In one or more embodiments, the electronic device 100 may further include a light-emitting element, and the light-emitting element may be disposed at a location adjacent to the display 101 in an area provided by the front plate 102. For example, the light-emitting element may provide state information of the electronic device 100 in the form of light. For another example, the light-emitting element may provide a light source operating in conjunction with the operation of a first camera module 105. In one or more embodiments, the light-emitting element may include at least one among an LED, an IR LED, and a xenon lamp.

The display 101 may be viewed from the outside of the electronic device 100 through, for example, a significant portion of the front plate 102. In one or more embodiments, the edge of the display 101 may be formed substantially identical to the outer shape (e.g., a curved surface) of the adjacent front plate 102. In one or more embodiments, in order to expand the exposed area of the display 101, the distance between the outer periphery of the display 101 and the outer periphery of the front plate 102 may be substantially formed equally. In one or more embodiments, a recess, a notch, or an opening may be formed in a portion of the screen display area of the display 101, and the electronic device 100 may include another electronic component, for example, the first camera module 105, a proximity sensor, or an illuminance sensor, aligned with the recess, the notch, or the opening.

In one or more embodiments, the electronic device 100 includes at least one among the at least one camera module 105, 112, 113, 114, and/or 115, a fingerprint sensor, and the flash 106 disposed on the rear surface of the screen display area of the display 101. In one or more embodiments, the display 101 may be combined with or disposed adjacent to at least one among a touch sensing circuit, a pressure sensor capable of measuring the strength (e.g., pressure) of a touch, and a digitizer for detecting a magnetic field-type stylus pen.

The audio module 103 may include at least one of a microphone hole and a speaker hole. A microphone for acquiring an external sound may be disposed in the microphone hole, and multiple microphones may be disposed to detect the direction of sound. In one or more embodiments, the speaker hole and the microphone hole may be implemented as one hole (e.g., the audio module 103), or a speaker (e.g., a piezo speaker) may be included on the electronic device 100 without the speaker hole. In one or more embodiments, the speaker hole may include at least one of an external speaker hole and a receiver hole for communication.

The electronic device 100 may generate an electrical signal or data value corresponding to an internal operating state or an external environmental state by using a sensor module which is not illustrated. The sensor module may include at least one among, for example, a proximity sensor disposed on the first surface 110A of a housing, a fingerprint sensor integrated with or disposed adjacent to the display 101, and a biometric sensor (e.g., an Heart Rate Monitor (HRM) sensor) disposed on the second surface 110B of the housing. In one or more embodiments, the sensor module further includes at least one among a gesture sensor, a gyro sensor, a barometric pressure sensor, a magnetic sensor, an acceleration sensor, a grip sensor, a color sensor, an Infrared (IR) sensor, a temperature sensor, a humidity sensor, and an illuminance sensor.

Among the at least one camera module 105, 112, 113, 114, and/or 115, the first camera module 105 may be disposed on the first surface 110A of the electronic device 100, and the second camera module 112, 113, 114, and/or 115 and the flash 106 may be disposed on the second surface 110B of the electronic device 100. The at least one camera module 105, 112, 113, 114, and/or 115 may include at least one among one or more lenses, an image sensor, and an image signal processor. The flash 106 may include, for example, a light-emitting diode or a xenon lamp. In one or more embodiments, two or more lenses (e.g., a wide-angle lens and a telephoto lens) and image sensors may be disposed on one surface of the electronic device 100.

The key input devices 117 may be disposed on the third surface 110C of the housing. In one or more embodiments, the electronic device 100 may not include some or all of the key input devices 117, and the key input devices 117 that are not included may be implemented in the form of a soft key on the display 101. In one or more embodiments, the key input devices 117 may include at least some of fingerprint sensors disposed on the second surface 110B of the housing.

The connector hole 108 may accommodate a connector for transmitting and receiving at least one of power and data to and from an external electronic device, or a connector for transmitting and receiving an audio signal to and from an external electronic device. The connector hole 108 may accommodate, for example, a Universal Serial Bus (USB) connector or an earphone jack. In one or more embodiments, without a separate connector hole 108, the electronic device 100 may wirelessly transmit and receive at least one of power and data to and from an external electronic device, or may wirelessly transmit and receive an audio signal to and from the external electronic device.

Figure 3:
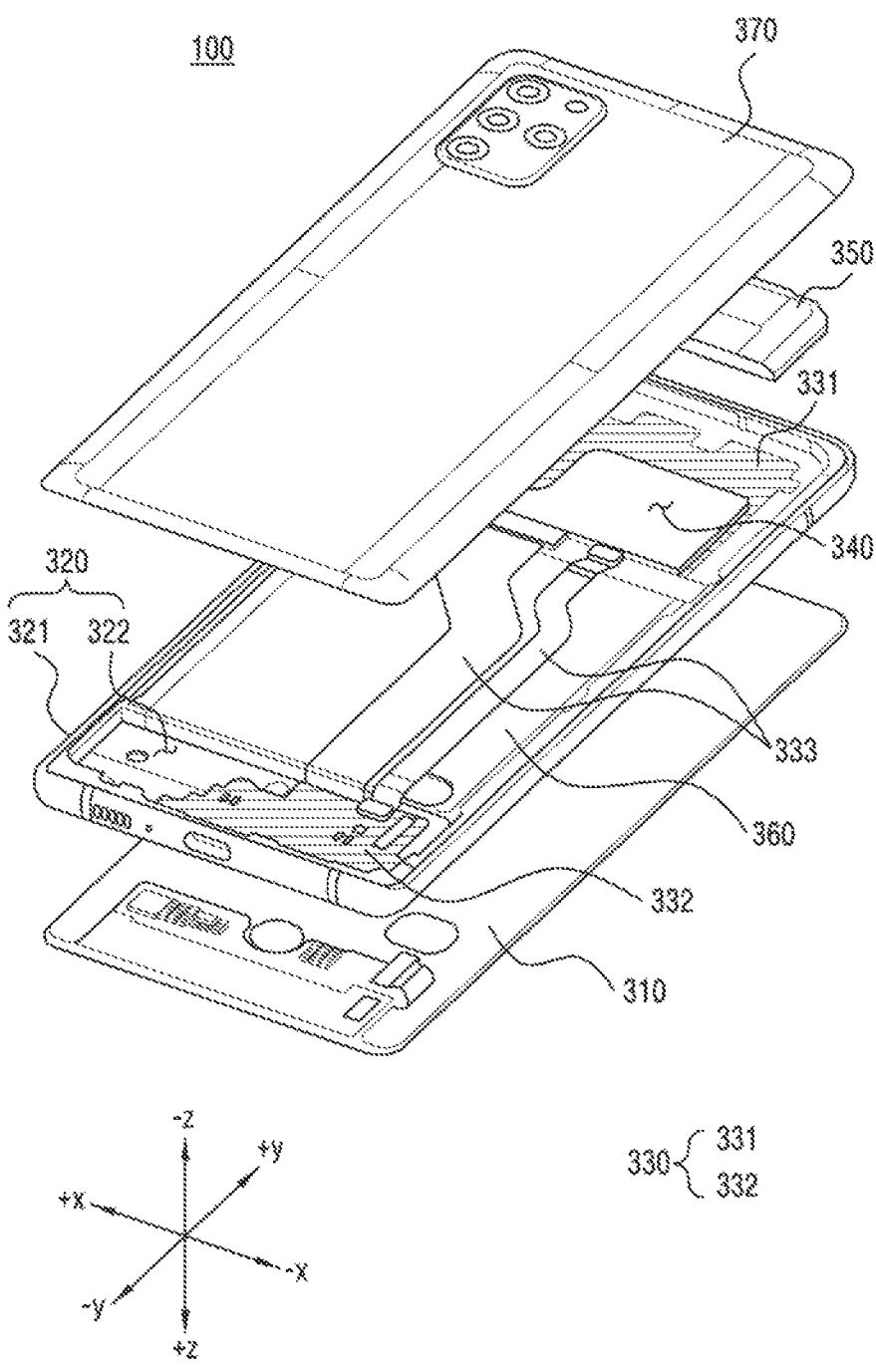
FIG. 3 illustrates the exploded state of an electronic device according to an embodiment.

FIG. 3 illustrates the exploded state of an electronic device according to an embodiment. In FIG. 3, an electronic device 100 according to an embodiment may include at least one among a front plate (e.g., the front plate 102 in FIG. 1), a display 310 (e.g., the display 101 in FIG. 1), a lateral member 320 (e.g., the lateral member 118 in FIGS. 1 and 2), at least one printed circuit board 330, a first support structure 340 (e.g., a shield can), a second support structure 350, a battery 360, and a rear plate 370 (e.g., the rear plate 111 in FIG. 2). At least one of the elements of the electronic device 100 illustrated in FIG. 3 may be identical or similar to the elements described with reference to FIGS. 1 and 2, and a redundant description may be omitted below.

According to one embodiment, the lateral member 320 may include at least one of a metal frame structure 321 and a support member 322. In an embodiment, the metal frame structure 321 may be formed of a conductive material (e.g., metal) to form a side surface (e.g., the third surface 110C in FIG. 1) of the electronic device 100. The metal frame structure 321 may include, for example, at least one of at least one conductive portion and at least one non-conductive portion insulating the at least one conductive portion. The at least one conductive portion may operate as an antenna radiator for transmitting and receiving an RF signal of a designated frequency band. In an embodiment, the support member 322 may be formed of at least one of a metal material and a non-metal material (e.g., polymer) and may provide a space in which electronic components can be disposed in the electronic device 100. For example, the display 310 may be disposed on one surface (e.g., one surface facing the +Z direction) of the support member 322, and the at least one printed circuit board 330 may be disposed on the other surface (e.g., one surface facing the –Z direction) of the support member 322. In one or more embodiments, the support member 322 may be connected to the metal frame structure 321 or formed integrally with the metal frame structure 321.

In an embodiment, multiple electronic components may be disposed on the at least one printed circuit board 330. For example, at least one among a processor (e.g., a processor 1620 in FIG. 16), a memory (e.g., a memory 1630 in FIG. 16), and an interface (e.g., an interface 1677 in FIG. 16) may be disposed on the at least one printed circuit board 330. The processor 1620 may include at least one among a central processing unit, an application processor, a graphics processing unit, an image signal processor, a sensor hub processor, and a communication processor. The memory 1630 may include at least one of volatile memory and non-volatile memory. The interface 1677 may include at least one among a High-Definition Multimedia Interface (HDMI), a Universal Serial Bus (USB) interface, an SD card interface, and an audio interface. The interface 1677 may electrically or physically connect the electronic device 100 to an external electronic device, and may include at least one among a USB connector, an SD card, a MultiMediaCard (MMC) connector, and an audio connector.

According to an embodiment, the at least one printed circuit board 330 may include at least one of a first printed circuit board 331 and a second printed circuit board 332. In an embodiment, the first printed circuit board 331 may be disposed in one area (e.g., an area facing the +Y direction) of the support member 322, and the second printed circuit board 332 may be disposed in another area (e.g., an area facing the –Y direction) of the support member 322 that is spaced apart from the first printed circuit board 331. In an embodiment, the first printed circuit board 331 and the second printed circuit board 332 may be electrically connected to each other through an electrical connection member 333. The electrical connection member 333 may include at least one among, for example, a flexible printed circuit board, a coaxial cable, and a board-to-board (B-to-B) connector. The structure of the at least one printed circuit board 330 is not limited to the illustrated embodiment. In one or more embodiments, the at least one printed circuit board 330 may be formed as one printed circuit board in which the first printed circuit board 331 and the second printed circuit board 332 are combined.

According to an embodiment, the first support structure 340 (e.g., the shield can) may be formed of a conductive material (e.g., metal) and disposed on the at least one printed circuit board 330. In an embodiment, a patch antenna may be disposed in at least one area (e.g., an area facing the –Z direction) of the first support structure 340, and the first support structure 340 may support the patch antenna. The patch antenna may operate as, for example, an antenna radiator that transmits and receives a Radio Frequency (RF) signal of an ultra-wide band.

In an embodiment, the first support structure 340 may shield multiple electronic components disposed on the at least one printed circuit board 330. For example, the first support structure 340 may be disposed to surround or cover the multiple electronic components, thereby blocking noise generated from the multiple electronic components.

According to an embodiment, the second support structure 350 may be formed of a material different from that of the first support structure 340. For example, the second support structure 350 may be formed of a non-conductive material (e.g., plastic), but the disclosure is not limited thereto.

In an embodiment, the second support structure 350 may be disposed in one area of the at least one printed circuit board 330 to prevent the multiple electronic components disposed on the at least one printed circuit board 330 from being damaged by an external impact. In an embodiment, the second support structure 350 may be disposed not to overlap the first support structure 340 when viewed from the top (e.g., the –Z-direction top) of the at least one printed circuit board 330. In another embodiment, the second support structure 350 may be disposed to partially overlap the first support structure 340.

According to one embodiment, the battery 360 may supply power to at least one element of the electronic device 100, and may include, for example, a non-rechargeable primary battery, a rechargeable secondary battery, or a fuel cell. In an embodiment, at least a portion of the battery 360 may be disposed substantially on the same plane as the at least one printed circuit board 330. In one or more embodiments, the battery 360 may be integrally disposed in the electronic device 100 or may be disposed to be detachable from the electronic device 100.

According to an embodiment, the rear plate 370 may form the rear surface (e.g., the second surface 110B in FIG. 2) of the electronic device 100. The rear plate 370 may protect internal elements of the electronic device 100 from external impact or inflow of foreign matter.

Figure 4:
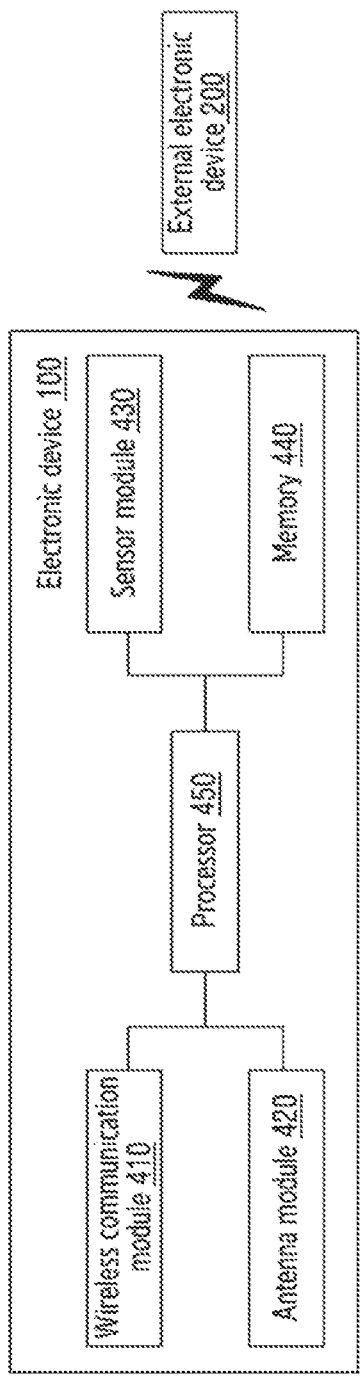
FIG. 4 illustrates at least some elements included in an electronic device according to an embodiment.

FIG. 4 illustrates at least some elements included in an electronic device according to an embodiment.

In FIG. 4, an electronic device 100 according to an embodiment may include a wireless communication module 410, an antenna module 420, a sensor module 430, a memory 440, and a processor 450, which are disposed in the inner space of a housing (e.g., the housing including the first surface 110A, the second surface 110B, and the third surface 110C, described above with reference to FIGS. 1 and 2).

In one or more embodiments, in the electronic device 100, at least one of the above-described elements may be omitted, or at least one other element may be included. For example, the electronic device 100 may further include a sensor hub processor that is implemented independently of the processor 450 and may perform, on its own, the functions of the processor 450 in an inactive state, a sleep state, or a low-power state of the electronic device 100. In addition, the electronic device 100 may further include at least some of the elements of the electronic device described with reference to FIGS. 1, 2, and 3 (e.g., the electronic device 100 in FIG. 1, 2, or 3), or at least some of elements of an electronic device to be described with reference to FIG. 16 (e.g., an electronic device 1601 in FIG. 16).

Figure 16:
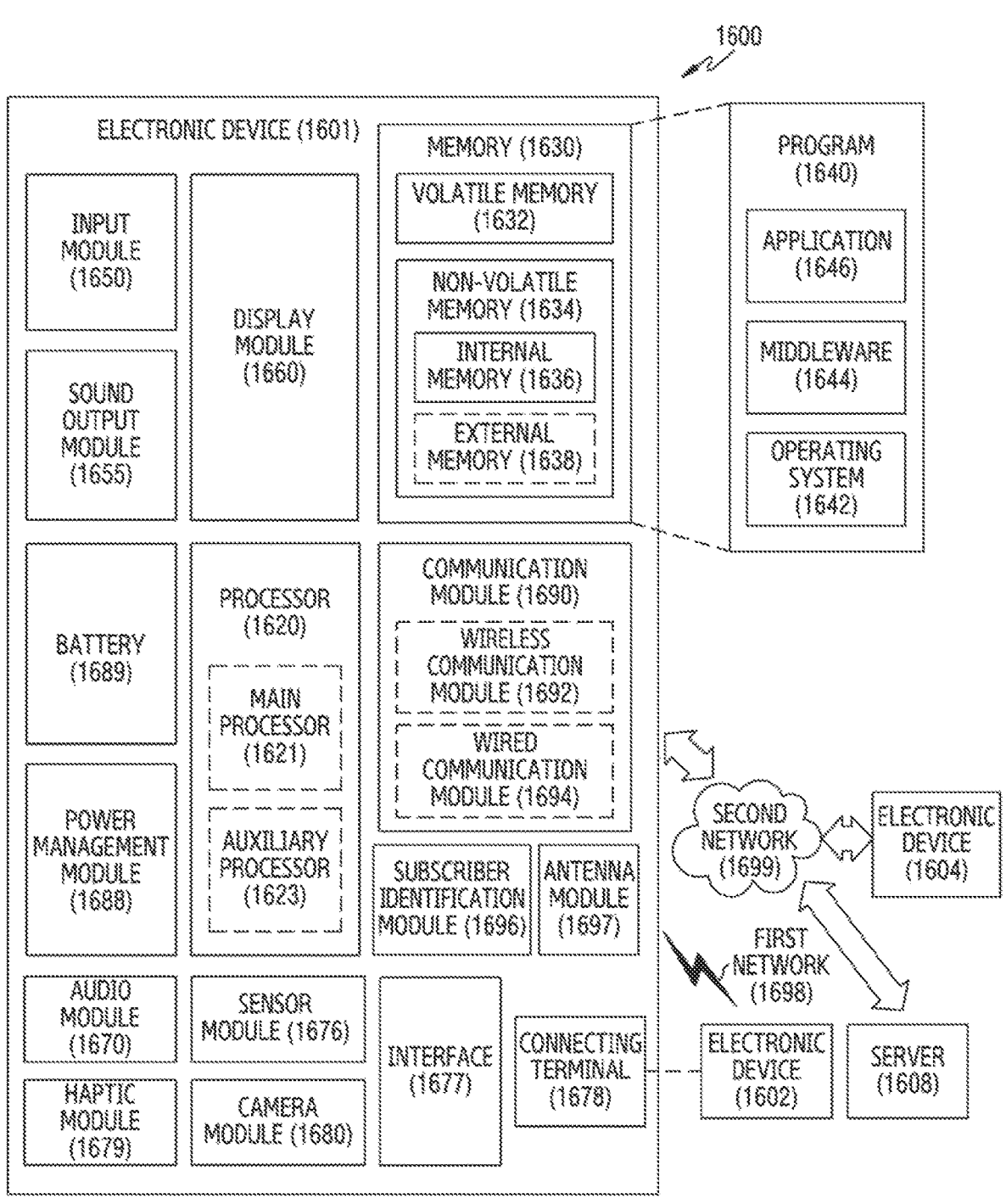
FIG. 16 illustrates an electronic device in a network environment according to one or more embodiments.

In this case, the wireless communication module 410, the antenna module 420, the sensor module 430, the memory 440, and the processor 450 may correspond to a wireless communication module 1692, an antenna module 1697, a sensor module 1676, a memory 1630, and a processor 1620 included in the electronic device 1601 in FIG. 16, respectively.

According to an embodiment, the wireless communication module 410 may support wireless communication between the electronic device 100 and at least one external electronic device 200 (e.g., a device (a smartphone) of the same type as the electronic device 100 or a device (a wearable device, an IoT device, an access point device, or a base station device) of a different type from the electronic device 100. For example, the wireless communication module 410 may establish wireless communication (e.g., Ultra-Wideband (UWB) wireless communication) with the at least one external electronic device 200 according to a prescribed protocol, and may support transmission and reception of signals or data using a frequency band supported by the wireless communication.

According to an embodiment, the antenna module 420 may transmit and receive signals or data to and from the at least one external electronic device 200. According to an embodiment, the antenna module 420 may include multiple antennas, and at least one antenna suitable for a communication method used in a short-distance communication network or a long-distance communication network, among the multiple antennas, may be selected and operated by the wireless communication module 410 or the processor 450. In an embodiment, the antenna module 420 may further include at least one of a flexible printed circuit board (e.g., the flexible printed circuit board 640 in FIG. 6) and a Radio Frequency Integrated Circuit (RFIC) electrically connected to the multiple antennas to process signals or data.

According to an embodiment, the sensor module 430 may detect a state of the electronic device 100 or a state of a surrounding environment of the electronic device 100, and may generate a signal or data corresponding to the detected state. In an embodiment, the sensor module 430 may include at least one among a gyro sensor, an acceleration sensor, and a 6-axis sensor. Reference may be made to signals or data generated by at least some of the above-described sensors in order to determine a tilt of the electronic device 100 or determine the posture of the electronic device 100 based on the tilt.

According to an embodiment, the memory 440 may store data related to operation of the electronic device 100, or may store at least one command related to functional operations of the elements of the electronic device 100. For example, the memory 440 may store at least one piece of data that can be used in a radio positioning operation for the at least one external electronic device 200. According to one embodiment, the at least one piece of data may include a compensation value for each tilt value of the electronic device 100 that can be used when the tilt of the electronic device 100 is detected by the sensor module 430 in the radio positioning operation for the at least one external electronic device 200. According to one or more embodiments, the compensation value for each tilt value of the electronic device 100 may be used to compensate for (or calibrate) angle-of-arrival data of an RF signal received from the at least one external electronic device 200 according to the degree of tilt of the electronic device 100. According to one or more embodiments, various tilt values of the electronic device 100 and compensation values corresponding to the corresponding tilt values may be mutually mapped and stored in the memory 440 in the form of a lookup table or index.

According to an embodiment, the processor 450 may include at least one among a central processing unit, an application processor, and a communication processor, and may control the above-described elements of the electronic device 100. For example, the processor 450 may be electrically or operatively connected to the elements of the electronic device 100 to transmit commands related to functional operations of the elements, stored in the memory 440, to the corresponding elements or to perform calculations or processing on signals or data received from the elements. According to one embodiment, in an operation of performing radio positioning on the at least one external electronic device 200 by using the multiple antennas included in the antenna module 420, the processor 450 may receive tilt information (e.g., a tilt value) of the electronic device 100 from the sensor module 430, and may determine the posture of the electronic device 100 based on the tilt information. When the electronic device 100 is determined to be tilted in a first direction (e.g., the +Z direction in FIG. 1 or 2) or a second direction (e.g., the −Z direction in FIG. 1 or 2) and is determined not to be tilted in a third direction (e.g., the +X direction, the −X direction, the +Y direction, or the −Y direction in FIG. 1 or 2), the processor 450 may use the compensation value for each tilt value of the electronic device 100 stored in the memory 440 to compensate for angle-of-arrival data acquired from an RF signal received from the at least one external electronic device 200 based on the multiple antennas. Alternatively, when it is determined that the electronic device 100 is tilted in the third direction and is not tilted in the first direction and the second direction, the processor 450 may use the separation distance between the multiple antennas calculated at the posture determination time to acquire angle-of-arrival data of an RF signal received from the at least one external electronic device 200 based on the multiple antennas.

In an embodiment, the tilting of the electronic device 100 in a specific direction may indicate a state in which an ending point of the electronic device 100 in one direction is tilted in the specific direction compared to an ending point in another direction.

For example, in FIG. 1 above, a state in which the electronic device 100 has a tilted posture in the first direction may indicate a state in which a +Y-direction ending point E1 of the electronic device 100 is tilted in the +Z direction compared to a −Y-direction ending point E2.

A state in which the electronic device 100 has a tilted posture in the second direction may correspond to a state in which the +Y-direction ending point E1 is tilted in the −Z direction compared to the −Y-direction ending point E2.

Alternatively, a state in which the electronic device 100 has a tilted posture in the first direction or the second direction may correspond to a state in which the first surface 110A (or the second surface 110B in FIG. 2) of the electronic device 100, which was parallel to the Y axis (e.g., an axis extending in the +Y direction and the −Y direction), is not parallel to the Y axis.

In another example, in FIG. 1, a state in which the electronic device 100 has a tilted posture in the third direction may correspond to a state in which the +Y-direction ending point E1 is tilted in the −X direction or the +X direction compared to the −Y-direction ending point E2 in a portrait mode of the electronic device 100, and may correspond to a state in which a −X-direction ending point E3 is tilted in the −Y direction or the +Y direction compared to a +X direction ending point E4 (or, the +X-direction ending point E4 is tilted compared to the −X-direction ending point E3) in a landscape mode of the electronic device 100.

Figure 5:
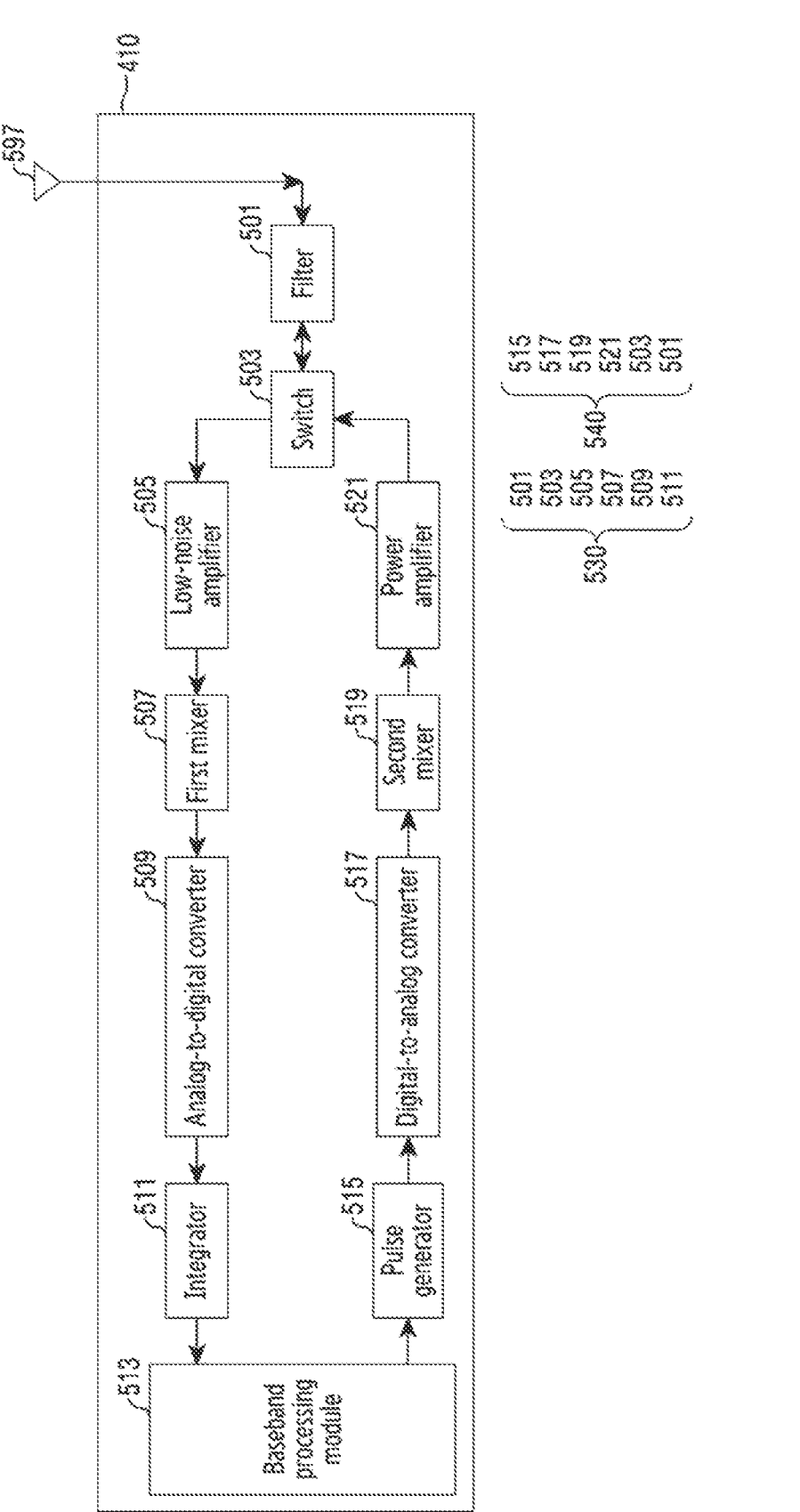
FIG. 5 illustrates at least some elements included in a wireless communication module according to an embodiment.

FIG. 5 illustrates at least some elements included in a wireless communication module according to an embodiment.

In FIG. 5, the wireless communication module 410 according to an embodiment may include an Ultra Wide-Band (UWB) receiver 530, a UWB transmitter 540, and a baseband processing module 513 in order to support UWB communication operation.

In an embodiment, the UWB receiver 530 may include at least one among a filter 501, a switch 503, a low-noise amplifier 505, a first mixer 507, an analog-to-digital converter 509, and an integrator 511.

In an embodiment, an antenna module 597 (e.g., the antenna module 420 in FIG. 4) may receive a UWB signal from at least one external electronic device (e.g., the external electronic device 200 in FIG. 4), and may transmit a UWB signal to the at least one external electronic device 200. According to one embodiment, the antenna module 597 may include at least one among a patch-type antenna, a monopole-type antenna, a dipole-type antenna, a biconical antenna, a horn-type antenna, and a spiral antenna, each of which has broadband characteristics for transmission and reception of a UWB signal.

In an embodiment, the filter 501 may minimize loss of a signal transmitted or received through the antenna module 597, and may separate the signal so that other channels are not affected by the transmitted or received signal. For example, with respect to the transmitted or received signal, the filter 501 may selectively allow a component of a designated frequency band to pass, and may attenuate components of the remaining frequency bands. According to one or more embodiments, the wireless communication module 410 may include multiple filters, and may selectively use the multiple filters according to a frequency band used.

In an embodiment, the switch 503 may switch a transfer path of the transmitted or received signal through opening and closing of an internal circuit. According to one or more embodiments, when the UWB receiver 530 and the UWB transmitter 540 each include a separate filter 501 so as not to share the signal transfer path, the switch 503 may be omitted in the wireless communication module 410.

In an embodiment, the low-noise amplifier 505 may amplify a signal received from the at least one external electronic device 200 while minimizing noise included in the received signal. The first mixer 507 may convert a center frequency band of a signal received from the at least one external electronic device 200. For example, the first mixer 507 may lower a center frequency band of a signal received from the low-noise amplifier 505.

In an embodiment, the analog-to-digital converter 509 may convert an analog signal received from the at least one external electronic device 200 into a digital signal that can be interpreted by a processor (e.g., the processor 450 in FIG. 4). The integrator 511 may generate an output signal by integrating an input signal (e.g., the digital signal transmitted from the analog-to-digital converter 509) for a specified time. In an embodiment, the output signal may be generated to have a relatively high gain in a relatively low frequency band.

In an embodiment, a UWB signal received from the at least one external electronic device 200 may be processed through at least one among the antenna module 597, the filter 501, the switch 503, the low-noise amplifier 505, the first mixer 507, the analog-to-digital converter 509, and the integrator 511 to be converted into a baseband signal, and the baseband signal may be input into the baseband processing module 513. In an embodiment, the baseband processing module 513 may acquire at least one of raw data on a UWB communication-based service and identification information of the at least one external electronic device 200 by processing the input baseband signal, and may provide the same to the processor 450.

In an embodiment, the UWB transmitter 540 may include at least one among a pulse generator 515, a digital-to-analog converter 517, a second mixer 519, a power amplifier 521, the switch 503, and the filter 501. Hereinafter, in describing the UWB transmitter 540, descriptions of elements (e.g., the switch 503 and the filter 501) that overlap those of the above-described UWB receiver 530 may be omitted.

In an embodiment, for a spectrum of a specific frequency band, the pulse generator 515 may generate a pulse on a time axis for a signal. The digital-to-analog converter 517 may convert a digital signal provided from the processor 450 (or the baseband processing module 513) into an analog signal for external transmission.

In an embodiment, the second mixer 519 may convert a center frequency band of a signal to be transmitted by the electronic device 100. For example, the second mixer 519 may increase a center frequency band of a signal received from the digital-to-analog converter 517. The power amplifier 521 may amplify power for transmission of a signal, which is to be transmitted by the electronic device 100, so that the signal can reach a desired point.

In an embodiment, the baseband signal processed by the baseband processing module 513 may be converted to a UWB signal through at least one among the pulse generator 515, the digital-to-analog converter 517, the second mixer 519, the power amplifier 521, the switch 503, and the filter 501, and the UWB signal may be transmitted to the at least one external electronic device 200 by the antenna module 597.

Figure 6:
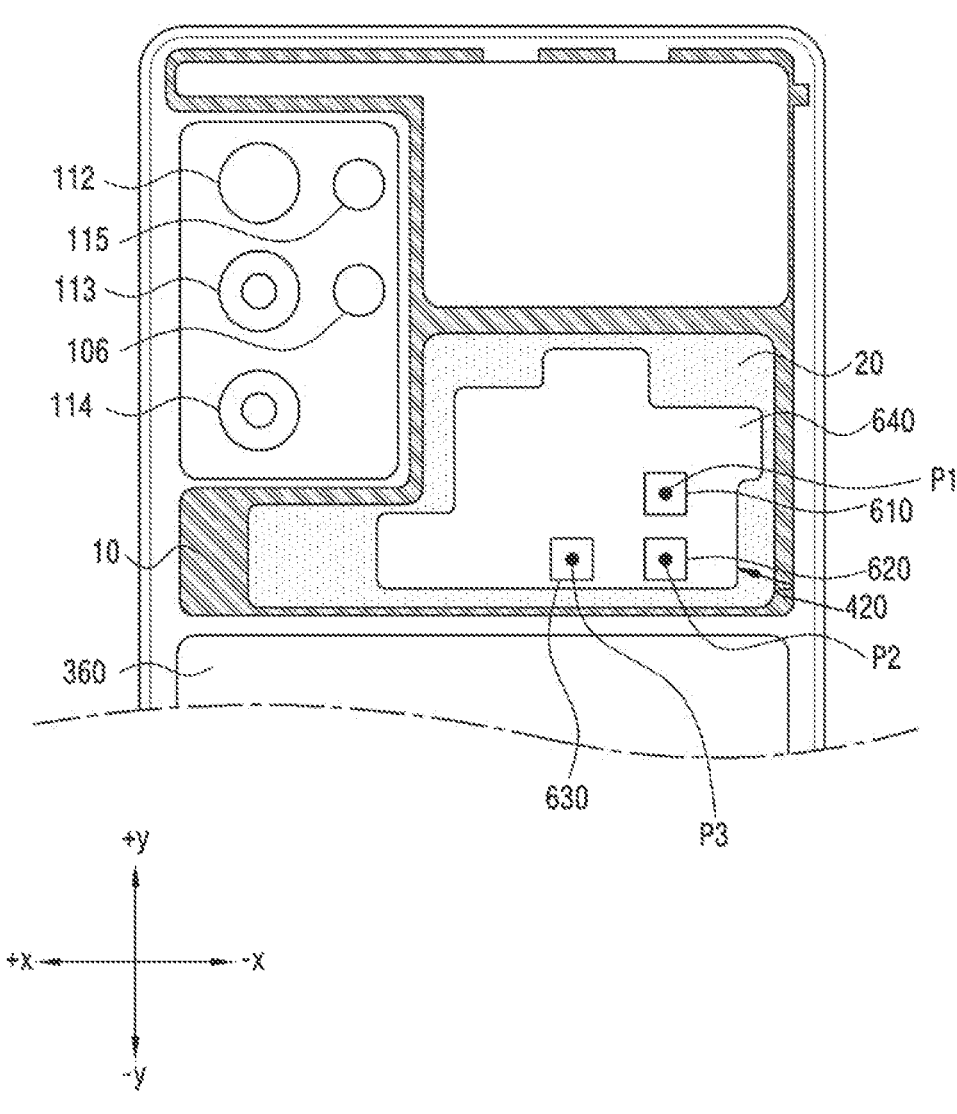
FIG. 6 illustrates an arrangement structure of multiple antennas according to an embodiment.
Figure 7:
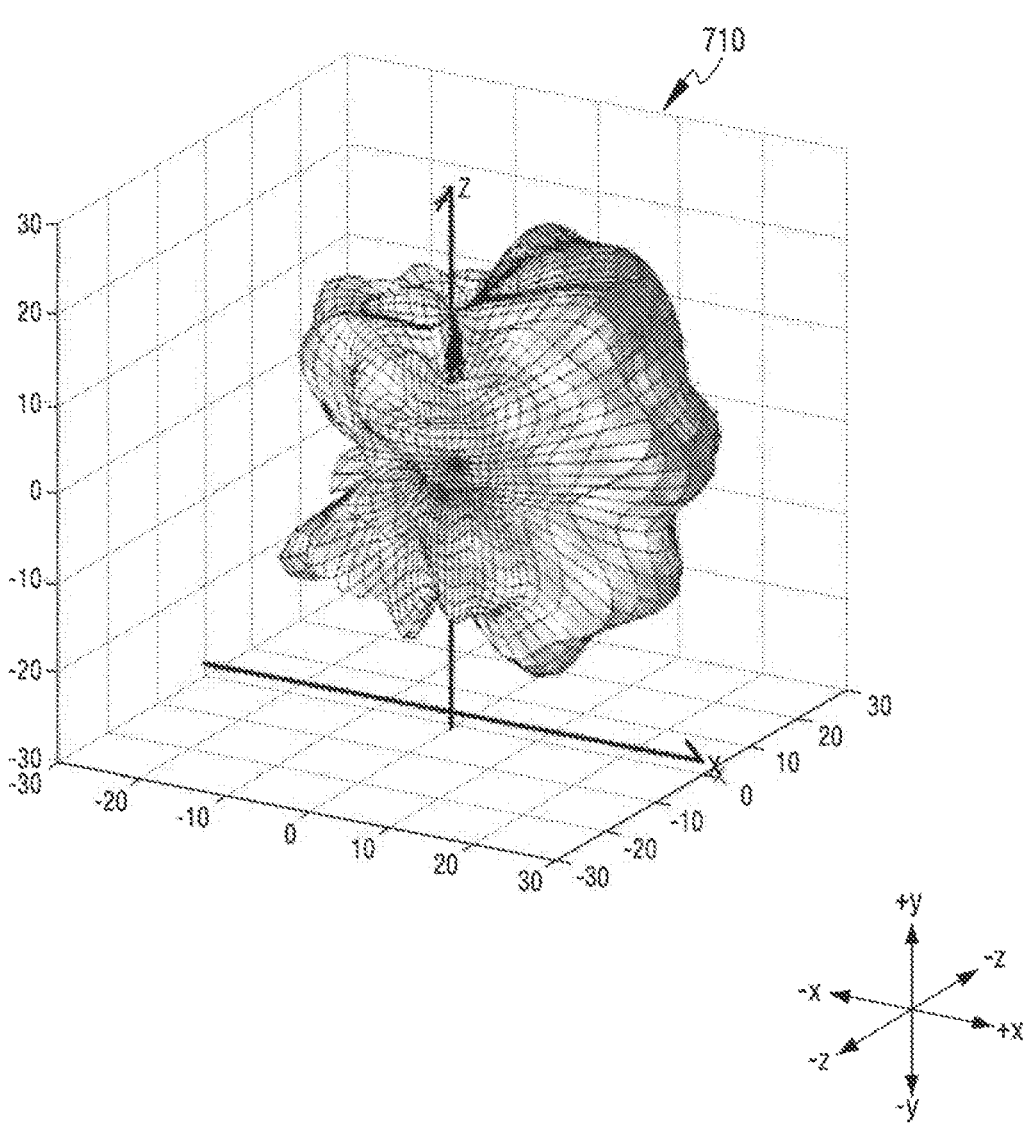
FIG. 7 illustrates a beam of a radiation pattern generated by multiple antennas according to an embodiment.

FIG. 6 illustrates an arrangement structure of multiple antennas according to an embodiment. FIG. 7 illustrates a beam of a radiation pattern generated by multiple antennas according to an embodiment. An electronic device illustrated in FIG. 6 may show the inside of the electronic device as seen with a rear plate (e.g., the rear plate 111 in FIG. 2 or the rear plate 370 in FIG. 3) removed.

In FIGS. 6 and 7, an electronic device 100 according to an embodiment may include an antenna module 420 electrically connected to a wireless communication module (e.g., the wireless communication module 410 in FIG. 4) to support UWB communication operation. According to one embodiment, the antenna module 420 may be disposed on a first support structure 20 (e.g., the first support structure 340 in FIG. 3) disposed in one area of a first printed circuit board 10 (e.g., the first printed circuit board 331 in FIG. 3).

For example, the antenna module 420 may be disposed on one surface of the first support structure 20 facing the rear plate (e.g., the rear plate 111 in FIG. 2 or the rear plate 370 in FIG. 3) of the electronic device 100.

In an embodiment, the antenna module 420 may include a flexible printed circuit board 640 and multiple antennas (e.g., a first antenna 610, a second antenna 620, and a third antenna 630) disposed on the flexible printed circuit board 640. The flexible printed circuit board 640 may include, for example, multiple layers, and may include a ground for grounding the multiple antennas 610, 620, and 630.

In an embodiment, the multiple antennas 610, 620, and 630 may be formed as conductors or conductive patterns on the flexible printed circuit board 640. For example, the multiple antennas 610, 620, and 630 may generate a beam 710 of a directional radiation pattern in an outward direction (e.g., the −Z direction in FIG. 3 or 7) from the inside of the electronic device 100, and may perform, based on the beam 710 of the directional radiation pattern, at least one of transmission and reception of an RF signal through a UWB communication channel.

According to an embodiment, the multiple antennas 610, 620, and 630 may be disposed in a designated arrangement on the flexible printed circuit board 640. For example, the first antenna 610 and the second antenna 620 may be aligned based on an axis extending in the illustrated +Y and −Y directions, and the second antenna 620 and the third antenna 630 may be aligned based on an axis extending in the illustrated +X and −X directions.

In an embodiment, the multiple antennas 610, 620, and 630 may be spaced apart from each other. The separation distance may correspond to, for example, the distance (e.g., about 17.4 mm) between each of power supply points P1, P2, and P3 of the multiple antennas 610, 620, and 630, and the separation distance may be designed as a half-wavelength distance for an RF signal that can be received through a UWB communication channel (e.g., channel 9) of a designated frequency band (e.g., about 7.75 GHz to 8.25 GHz).

According to an embodiment, the multiple antennas 610, 620, and 630 may be selectively operated according to a portrait mode or a landscape mode of the electronic device 100. For example, a processor (e.g., the processor 450 in FIG. 4) of the electronic device 100 may receive a signal or data related to detection of the portrait mode or the landscape mode from a sensor module (e.g., the sensor module 430 in FIG. 4), and may determine the mode of the electronic device 100 based on the signal or the data. In an embodiment, when the portrait mode of the electronic device 100 is determined, the processor 450 may select, as two antennas for UWB communication operation, the second antenna 620 and the third antenna 630, among the multiple antennas 610, 620, and 630, which are aligned in directions (e.g., the +X direction and the −X direction)

perpendicular to directions (e.g., the +Y direction and the −Y direction) corresponding to the portrait mode.

In another embodiment, in response to determining the landscape mode of the electronic device 100, the processor 450 may select, as two antennas for the UWB communication operation, the first antenna 610 and the second antenna 620, among the multiple antennas 610, 620, and 630, which are aligned in directions (e.g., the +Y direction and the −Y direction) perpendicular to directions (e.g., +X direction and −X direction) corresponding to the landscape mode.

The processor 450 may control activation of the two antennas selected based on the mode of the electronic device 100 and deactivation of the other antenna (which is not selected). According to one or more embodiments, in order to use various operations related to radio positioning for at least one external electronic device (e.g., the external electronic device 200 in FIG. 4), the processor 450 may operate all of the multiple antennas 610, 620, and 630 in an active state, regardless of the portrait mode or the landscape mode of the electronic device 100.

According to one or more embodiments, in the electronic device 100 as viewed after removal of the rear plate (e.g., the rear plate 111 in FIG. 2 or the rear plate 370 in FIG. 3) of the electronic device 100, at least one among at least one camera module 112, 113, 114, and/or 115, a flash 106, and a battery 360 may be disposed in an area adjacent to the antenna module 420. For example, at least one of the at least one camera module 112, 113, 114, and/or 115 and the flash 106 may disposed in a space formed in the +X direction with respect to the antenna module 420 (e.g., a space defined by the shape of the first printed circuit board 10), and the battery 360 may be disposed in a space formed in the −Y direction with respect to the antenna module 420.

Figure 8:
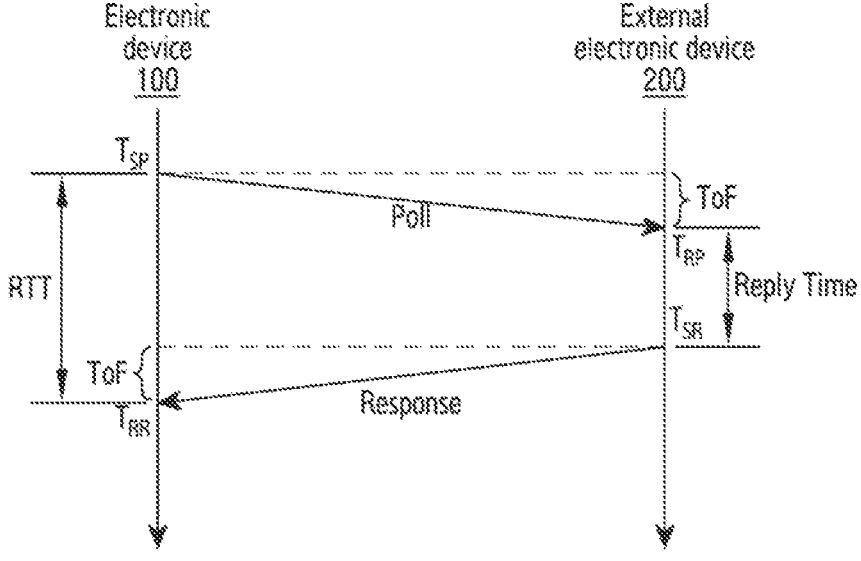
FIG. 8 illustrates an operation for acquiring distance data between an external electronic device and an electronic device according to an embodiment.
Figure 9:
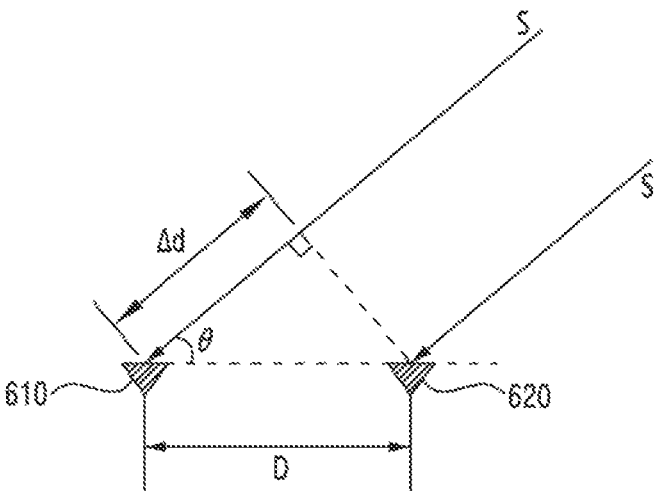
FIG. 9 illustrates an operation for acquiring angle-of-arrival data of an RF signal received from an external electronic device according to an embodiment.

FIG. 8 illustrates an operation for acquiring distance data between an external electronic device and an electronic device according to an embodiment. FIG. 9 illustrates an operation for acquiring angle-of-arrival data of an RF signal received from an external electronic device according to an embodiment.

In FIG. 8, a processor of the electronic device 100 (e.g., the processor 450 in FIG. 4) may use at least one of multiple antennas (e.g., the first antenna 610, the second antenna 620, and the third antenna 630 in FIG. 6) included in an antenna module (e.g., the antenna module 420 in FIG. 4) to acquire distance data between the electronic device 100 and the at least one external electronic device 200, and angle-of-arrival data of an RF signal received from the at least one external electronic device 200.

In an embodiment, the processor 450 of the electronic device 100 may use a designated ranging method (e.g., Two-Way Ranging (TWR)) to acquire the distance data between the electronic device 100 and the at least one external electronic device 200. The processor 450 may use at least one among the first antenna 610, the second antenna 620, and the third antenna 630 to transmit a first RF signal of a frequency band (e.g., from about 3.1 GHz to 10.6 GHz) supported by a UWB communication channel. For example, the processor 450 may transmit the first RF signal including a poll message (or packet) indicating a request for distance measurement. The processor 450 may identify a transmission time ($T_{SP}$ in FIG. 8) of the first RF signal. According to an embodiment, the first RF signal may be received by the at least one external electronic device 200 after a predetermined Time of Flight (ToF) has elapsed from the transmission time ($T_{SP}$ in FIG. 8).

According to an embodiment, the at least one external electronic device 200 may transmit a second RF signal of a frequency band supported by the UWB communication channel, in response to the reception of the first RF signal. For example, the at least one external electronic device 200 may transmit the second RF signal including a response message (or a packet) responding to the poll message at a time ($T_{SR}$ in FIG. 8) at which a predetermined response time (Reply Time) has elapsed from the reception time ($T_{RP}$ in FIG. 8) of the first RF signal.

In an embodiment, the processor 450 of the electronic device 100 may receive the second RF signal by using at least one among the first antenna 610, the second antenna 620, and the third antenna 630. For example, the processor 450 may receive the second RF signal at a time ($T_{RR}$ in FIG. 8) when a predetermined Time of Flight (ToF in FIG. 8) elapses from the transmission time ($T_{SR}$ in FIG. 8) of the second RF signal. In an embodiment, the processor 450 may calculate a Round Trip Time (RTT in FIG. 8) indicating the RF signal round-trip time between the electronic device 100 and the at least one external electronic device 200 in response to the reception of the second RF signal. For example, the processor 450 may calculate an RTT corresponding to the difference between the transmission time ($T_{SP}$ in FIG. 8) of the first RF signal and the reception time ($T_{RR}$ in FIG. 8) of the second RF signal, and may acquire, based on the RTT, the distance data between the electronic device 100 and the at least one external electronic device 200.

In FIG. 9, a processor (e.g., the processor 450 in FIG. 4) of an electronic device (e.g., the electronic device 100 in FIG. 8) may use a phase difference between RF signals S, which are received from at least one external electronic device (e.g., the external electronic device 200 in FIG. 8), to acquire angle-of-arrival θ data (or calculate an angle-of-arrival value) of each of the RF signals S. According to an embodiment, each of the RF signals S received from the at least one external electronic device 200 may be a signal of a frequency band supported by a UWB communication channel, and may correspond to the second RF signal described above with reference to FIG. 8 or may be a separate signal distinct from the second RF signal.

In an embodiment, the processor 450 of the electronic device 100 may receive a RF signal ("S" in FIG. 9), which is transmitted from the at least one external electronic device 200, by using each of at least two antennas (e.g., the first antenna 610 and the second antenna 620) among multiple antennas (e.g., the first antenna 610, the second antenna 620, and the third antenna 630 in FIG. 6) included in an antenna module (e.g., the antenna module 420 in FIG. 4). The processor 450 may calculate a reception distance difference Δd between the RF signal ("S" in FIG. 9) received through the first antenna 610 and the RF signal ("S" in FIG. 9) received through the second antenna 620. For example, the processor 450 may calculate the reception distance difference Δd between the RF signal ("S" in FIG. 9), based on the difference a first time at which the RF signal ("S" in FIG. 9) has been received through the first antenna 610 and a second time at which the RF signal ("S" in FIG. 9) has been received through the second antenna 620. In an embodiment, the processor 450 may calculate, based on the calculated reception distance difference Δd, a phase difference ΔØ between the RF signals S received through the first antenna 610 and the second antenna 620, respectively. For example, the processor 450 may use Equation 1 (shown below) to calculate the phase difference ΔØ for the RF signals S received through the first antenna 610 and the second antenna 620, respectively. In Equation 1, λ may indicate the wavelength of the RF signals S received from the at least one external electronic device 200.

$$\Delta\phi = \frac{2\pi}{\lambda}\Delta d \qquad \text{[Equation 1]}$$

In an embodiment, the processor 450 may use using Equation 2 (shown below) to calculate the angle-of-arrival θ of the RF signals S received from the at least one external electronic device 200. For example, the processor 450 may acquire the angle-of-arrival θ data of the RF signals S by using a separation distance D between the first antenna 610 and the second antenna 620 (e.g., the distance (approximately 17.4 mm) between a feed point of the first antenna 610 (P1 in FIG. 6) and a feed point of the second antenna 620) (P2 in FIG. 6) and the phase difference ΔØ between the RF signals S received through the first antenna 610 and the second antenna 620, respectively.

$$AOA(\theta) = \cos^{-1}\frac{\Delta\phi}{2\pi D/\lambda} \qquad \text{[Equation 2]}$$

In the above description, as an example for acquiring the angle-of-arrival θ data of the RF signal ("S" in FIG. 9) received from the at least one external electronic device 200, reference has been made to the first antenna 610 and the second antenna 620 of the antenna module 420. However, according to one or more embodiments, the combination of the first antenna 610 and the second antenna 620 may be replaced with a combination of any two of the first antenna 610, the second antenna 620, and the third antenna 630.

In an embodiment, the processor 450 may estimate or determine the location of the at least one external electronic device 200 by using at least one of the acquired distance data between the electronic device 100 and the at least one external electronic device 200 and the acquired angle-of-arrival θ data of the RF signals S received from the at least one external electronic device 200. Based on the determined location of the at least one external electronic device 200, the processor 450 may transmit a signal or data related to controlling functions of the external electronic device to the at least one external electronic device 200, or may transmit a signal or data related to the provision of a location-based service.

Figure 10:
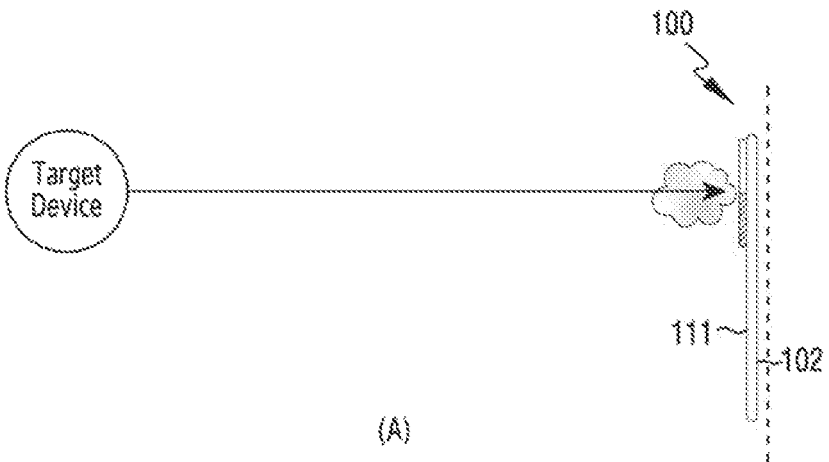
FIG. 10 illustrates a tilted posture of an electronic device according to an embodiment.
Figure 10:
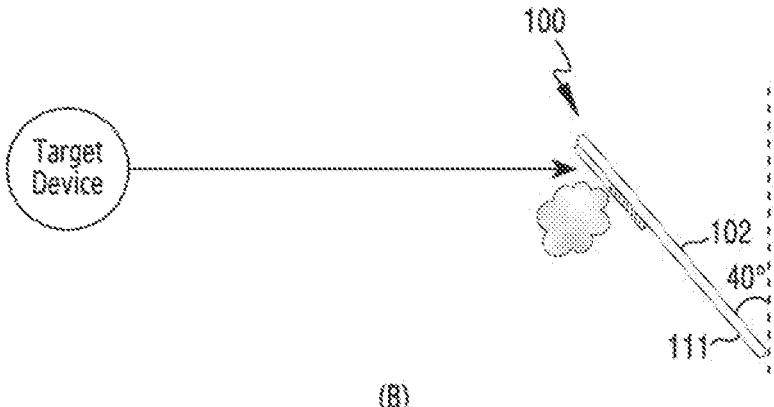
Figure 10:
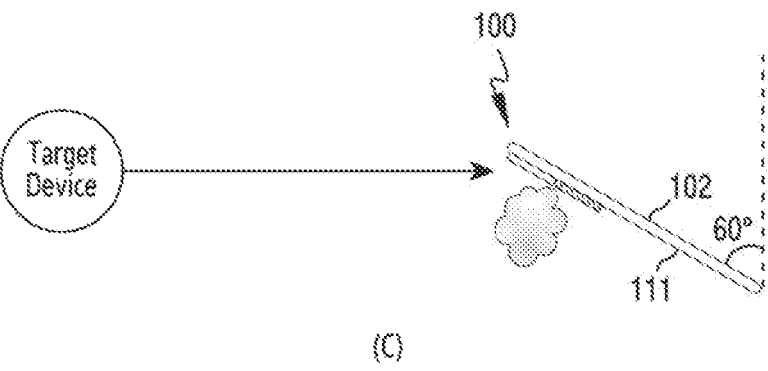
Figure 11:
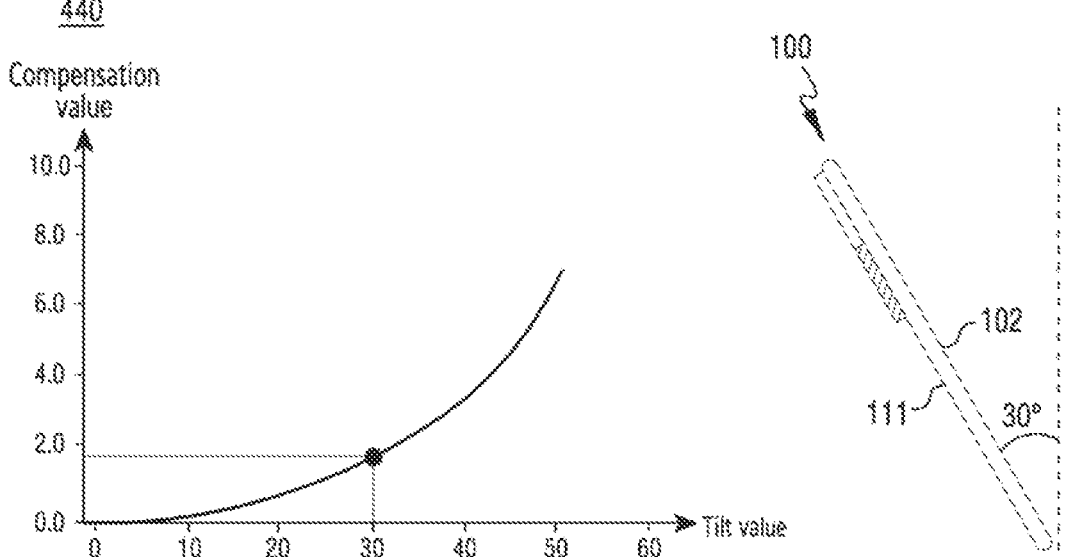
FIG. 11 illustrates a compensation value applied to angle-of-arrival data according to a tilted posture of an electronic device according to an embodiment.

FIG. 10 illustrates a tilted posture of an electronic device according to an embodiment. FIG. 11 illustrates a compensation value applied to angle-of-arrival data according to a tilted posture of an electronic device according to an embodiment.

In FIGS. 10 and 11, an electronic device 100 may have a first posture (A) in which the electronic device is matched, at 0 degrees, with a target device (e.g., the external electronic device 200 in FIG. 4) that transmits an RF signal through a frequency band supported by a UWB communication channel. In an embodiment, the 0-degree matching with the target device may correspond to a state in which, with reference to a portrait mode of the electronic device 100, the electronic device 100 is not tilted at all in a first direction (e.g., the +Z direction in FIG. 1 or 2, the direction faced by the front plate 102 in FIG. 1, or the direction faced by the first surface 110A in FIG. 1), a second direction (e.g., the −Z direction in FIG. 1 or 2, the direction faced by the rear plate 111 in FIG. 2, or the direction faced by the second surface 110B in FIG. 2), or a third direction (e.g., the +X direction, the −X direction, the +Y direction, or the −Y direction in FIG. 1 or 2, the direction faced by the lateral member 118 in FIG. 1 or 2, or the direction faced by the third surface 110C in FIG. 1).

In this case, multiple antennas (e.g., the first antenna 610, the second antenna 620, and the third antenna 630 in FIG. 6) included in an antenna module (e.g., the antenna module 420 in FIG. 4) of the electronic device 100 may generate a beam of a radiation pattern directed toward the target device, and may receive, based on the beam of the radiation pattern, an RF signal transmitted from the target device with a high gain. Alternatively, the electronic device 100 may have a second posture (B) or a third posture (C) in which the electronic device 100 is tilted in the second direction according to a user's gripping type or the type of mounting on a predetermined substrate.

For example, while being not tilted in the third direction, the electronic device 100 may have a second posture (B) in which the electronic device 100 is tilted in the second direction toward the target device or a third posture (C) in which the electronic device 100 is tilted more in the second direction than the second posture (B). The electronic device 100 may have a posture in which the electronic device 100 is tilted in the first direction opposite to that of the target device while not tilted in the third direction.

According to one or more embodiments, when the electronic device 100 has the second posture (B) or the third posture (C) in which the electronic device 100 is tilted in the second direction, the multiple antennas 610, 620, and 630 included in the antenna module 420 of the electronic device 100 may generate a beam of a radiation pattern, at least a part of which is not directed toward the target device, according to the degree of tilt of the electronic device 100. In this case, the deterioration of properties of RF signals transmitted and received by the multiple antennas 610, 620, and 630 may occur, or the noise level of the RF signals transmitted and received by the multiple antennas 610, 620, and 630 may be increased. Furthermore, a deviation may occur in angle-of-arrival data of an RF signal received from the target device.

According to an embodiment, a processor (e.g., the processor 450 in FIG. 4) of the electronic device 100 determine the posture of the electronic device 100 after acquiring first angle-of-arrival data of an RF signal received from at least one external electronic device 200 (or calculating a first angle-of-arrival value). For example, the processor 450 may acquire tilt information (e.g., a tilt value) of the electronic device 100 provided from a sensor module (e.g., the sensor module 430 in FIG. 4) according to a designated period in response to the acquisition of the first angle-of-arrival data, and may determine the posture of the electronic device 100 based on the tilt information.

In another example, the processor 450 requests tilt information of the electronic device 100 from the sensor module 430 in response to the acquisition of the first angle-of-arrival data, and may determine the posture of the electronic device 100 based on the tilt information of the electronic device 100 provided from the sensor module 430 in response to the request.

In another example, the processor 450 may acquire tilt information of the electronic device 100 from a sensing signal or sensing data provided from the sensor module 430, and may determine the posture of the electronic device 100 based on the tilt information. In one embodiment, the processor 450 may determine, based on the tilt information (e.g., the tilt value of the electronic device 100), a state in which the front plate 102 (or the first surface 110A in FIG.

1) of the electronic device 100 is tilted in the first direction, or a state in which the rear plate 111 (or the second surface 110B in FIG. 2) of the electronic device 100 is tilted in the second direction, and when it is determined that the lateral member 118 on one side of the electronic device 100 is not tilted in the third direction, may determine that the electronic device 100 has a tilted posture in the first direction or the second direction.

In an embodiment, the processor 450 may determine correction (or calibration) of the acquired first angle-of-arrival data in response to the determination of the posture of the electronic device 100 tilted in the first direction or the second direction. The processor 450 may identify a compensation value stored in the memory 440 in order to use the compensation value when correcting the angle-of-arrival data. The compensation value, for example, may be pre-stored in the memory 440 by the processor 450 in a manufacturing process or development process of the electronic device 100. For example, the processor 450 may store, in the memory 440, multiple tilt values corresponding to the posture of the electronic device 100 tilted in the first direction or the second direction and multiple compensation values corresponding to the multiple tilt values, and the tilt values and the compensation values corresponding to each other may be mapped to each other and stored in the form of a lookup table or an index.

According to an embodiment, as an operation of identifying the compensation value, the processor 450 may identify, when the tilt information (e.g., the tilt value) of the electronic device 100 indicates a first angle (e.g., 20 degrees), a first compensation value (e.g., 1.5) mapped to the first angle with reference to the lookup table or the index. Similarly, when the tilt information (e.g., the tilt value) of the electronic device 100 indicates a second angle (e.g., 30 degrees) different from the first angle, the processor 450 may identify a second compensation value (e.g., 2.0) mapped to the second angle on the lookup table or the index.

According to one or more embodiments, the processor 450 may map one compensation value to multiple tilt values grouped into a designated range and store the same in the lookup table or the index. For example, when the designated range is set to 5 degrees, the processor 450 may map a first compensation value to multiple first grouped tilt values (e.g., 26 degrees to 30 degrees) to store the same, and may map a second compensation value different from the first compensation value to multiple second grouped tilt values (e.g., 31 degrees to 35 degrees) to store the same. In this case, as an operation of identifying the compensation value, the processor 450 may identify a compensation value mapped to a group including the tilt information (e.g., the tilt value) of the electronic device 100.

According to one or more embodiments, the multiple compensation values may be determined through a designated test inspection in a manufacturing process or development process of the electronic device 100. For example, a compensation value capable of minimizing or reducing a deviation of angle-of-arrival data acquired by the electronic device 100 having a specific tilt value may be mapped to the specific tilt value.

In an embodiment, the processor 450 may compensate for (or calibrate) first angle-of-arrival data by using the identified compensation value. For example, the processor 450 may add the identified compensation value to the first angle-of-arrival data, and may acquire, therefrom, second angle-of-arrival data in which a deviation of the first angle-of-arrival data is minimized or reduced. The processor 450 may determine the location of the at least one external electronic device 200 by using at least one of the second angle-of-arrival data and distance data between the electronic device 100 and the at least one external electronic device 200 acquired through RF signal transmission and reception between the electronic device 100 and the at least one external electronic device 200.

Figure 12:
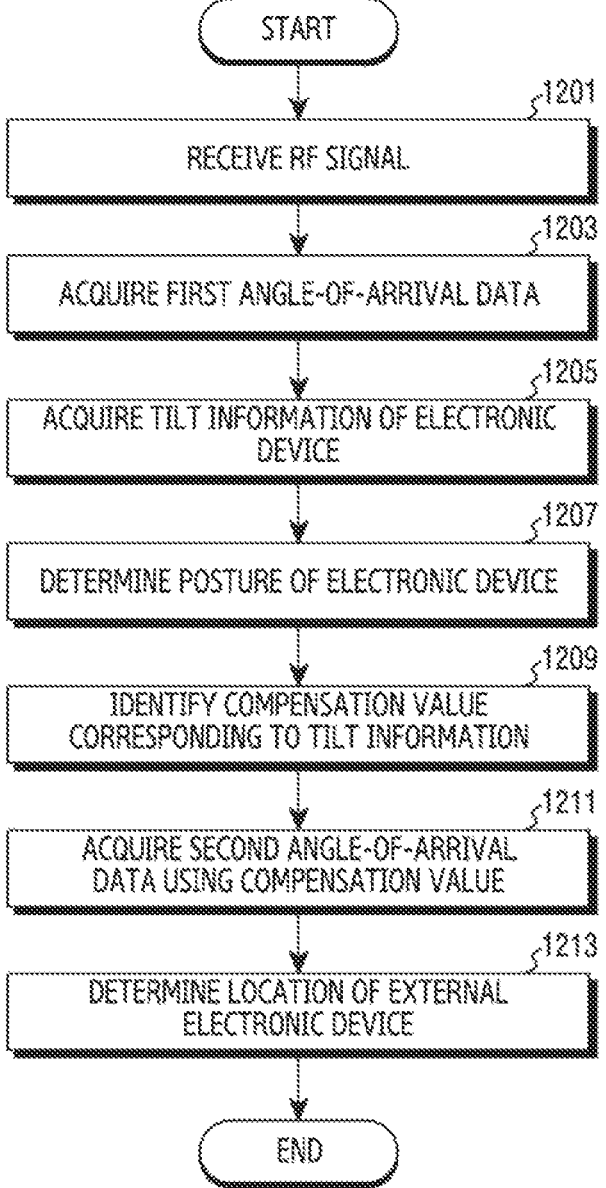
FIG. 12 illustrates an operation for acquiring angle-of-arrival data by an electronic device according to an embodiment.

FIG. 12 illustrates an operation for acquiring angle-of-arrival data by an electronic device according to an embodiment. Operations described below with reference to FIG. 12 may correspond to the operations of the processor described through FIG. 8, 9, 10, or 11, and some redundant descriptions may be omitted.

In FIG. 12, in operation 1201, a processor (e.g., the processor 450 in FIG. 4) of an electronic device (e.g., the electronic device 100 in FIG. 4) according to an embodiment may receive an RF signal of a frequency band supported by a UWB communication channel from at least one external electronic device (e.g., the external electronic device 200 in FIG. 4). For example, the processor 450 may receive the RF signal by using at least two antennas among multiple antennas (e.g., the first antenna 610, the second antenna 620, and the third antenna 630 in FIG. 6) included in an antenna module (e.g., the antenna module 420 in FIG. 4)

According to an embodiment, in operation 1203, the processor 450 may acquire first angle-of-arrival data (or calculate a first angle-of-arrival value) of the RF signal. For example, the processor 450 may acquire first angle-of-arrival data of the RF signal, based on the phase difference between RF signals received through the selected at least two antennas and the separation distance between the selected at least two antennas (e.g., the distance between feed points of the at least two antennas).

According to an embodiment, in operation 1205, the processor 450 may acquire tilt information (e.g., a tilt value) of the electronic device 100 from a sensor module (e.g., the sensor module 430 in FIG. 4). For example, the processor 450 may acquire tilt information of the electronic device 100 provided by the sensor module 430 according to a designated period, may request and acquire tilt information of the electronic device 100 from the sensor module 430, or may acquire tilt information from a sensing signal or sensing data received from the sensor module 430.

According to an embodiment, in operation 1207, the processor 450 may determine the posture of the electronic device 100 based on the acquired tilt information of the electronic device 100. For example, when it is determined, on the tilt information (e.g., the tilt value) of the electronic device 100, that a front plate (e.g., the front plate 102 in FIG. 1) (or the first surface 110A in FIG. 1) of the electronic device 100 is tilted in a first direction (e.g., the +Z direction in FIG. 1 or 2, the direction faced by the front plate 102 in FIG. 1, or the direction faced by the first surface 110A in FIG. 1).

Or it is determined that a rear plate (e.g., the rear plate 111 in FIG. 2) (or the second surface 110B in FIG. 2) of the electronic device 100 is tilted in a second direction (e.g., the −Z direction in FIG. 1 or 2, the direction faced by the rear plate 111 in FIG. 2, or the direction faced by the second surface 110B in FIG. 2), and when it is determined that one lateral member (e.g., the lateral member 118 in FIG. 1) (or the third surface 110C in FIG. 1) of the electronic device 100 is not tilted in a third direction (e.g., the +X direction, the −X direction, the +Y direction, or the −Y direction in FIG. 1 or 2, the direction faced by the lateral member 118 in FIG. 1 or 2, or the direction faced by the third surface 110C in FIG. 1), the processor 450 may determine the posture of the electronic device 100 tilted in the first direction or the second direction.

In an embodiment, when it is determined that the electronic device 100 has a posture in which the electronic device 100 is tilted in the first direction or the second direction and not tilted in the third direction, the processor 450 may identify a compensation value corresponding to the tilt information (e.g., the tilt value) of the electronic device 100 in operation 1209. Multiple tilt values corresponding to the posture of the electronic device 100 tilted in the first direction or the second direction and multiple compensation values corresponding to the multiple tilt values, respectively are mutually mapped and pre-stored in the form of a lookup table or index in a memory (e.g., the memory 440 in FIG. 4).

According to an embodiment, in operation 1211, the processor 450 may acquire second angle-of-arrival data (or calculate a second angle-of-arrival value) by using the identified compensation value. For example, the processor 450 may add the identified compensation value to the first angle-of-arrival data, thereby acquiring second angle-of-arrival data in which a deviation of the first angle-of-arrival data is minimized or reduced by the compensation value.

According to an embodiment, in operation 1213, the processor 450 may determine the location of the at least one external electronic device 200 that has transmitted the RF signal. For example, the processor 450 may determine the location of the at least one external electronic device 200 by using at least one of the second angle-of-arrival data and distance data between the electronic device 100 and the at least one external electronic device 200 acquired through RF signal transmission and reception between the electronic device 100 and the at least one external electronic device 200.

In one or more embodiments, the processor 450 may transmit, based on the determined location of the at least one external electronic device 200, signals or data related to controlling functions of the external electronic device to the at least one external electronic device 200, or may transmit signals or data related to the provision of a location-based service.

Figure 13:
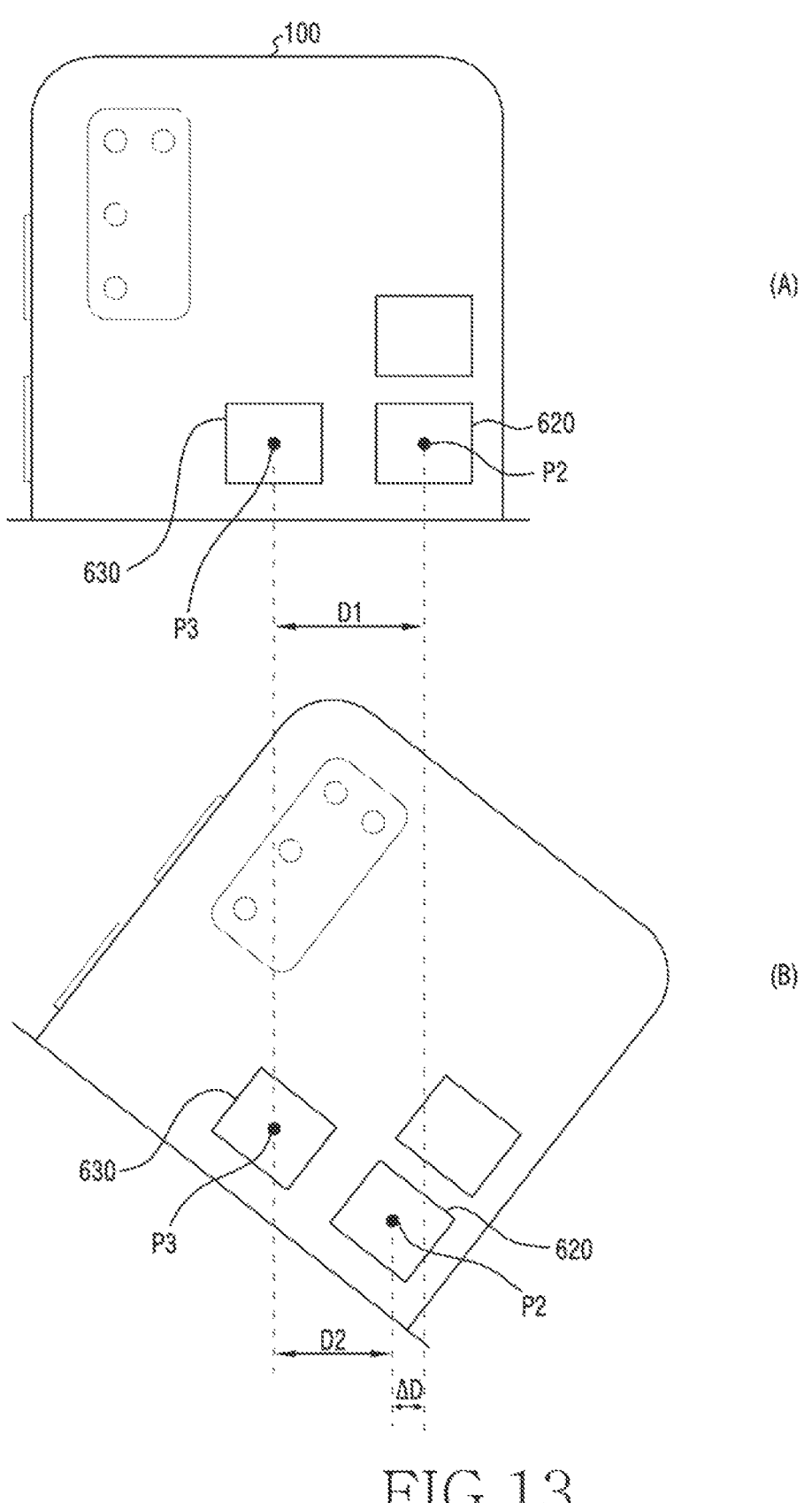
FIG. 13 illustrates a tilted posture of an electronic device according to another embodiment.
Figure 14:
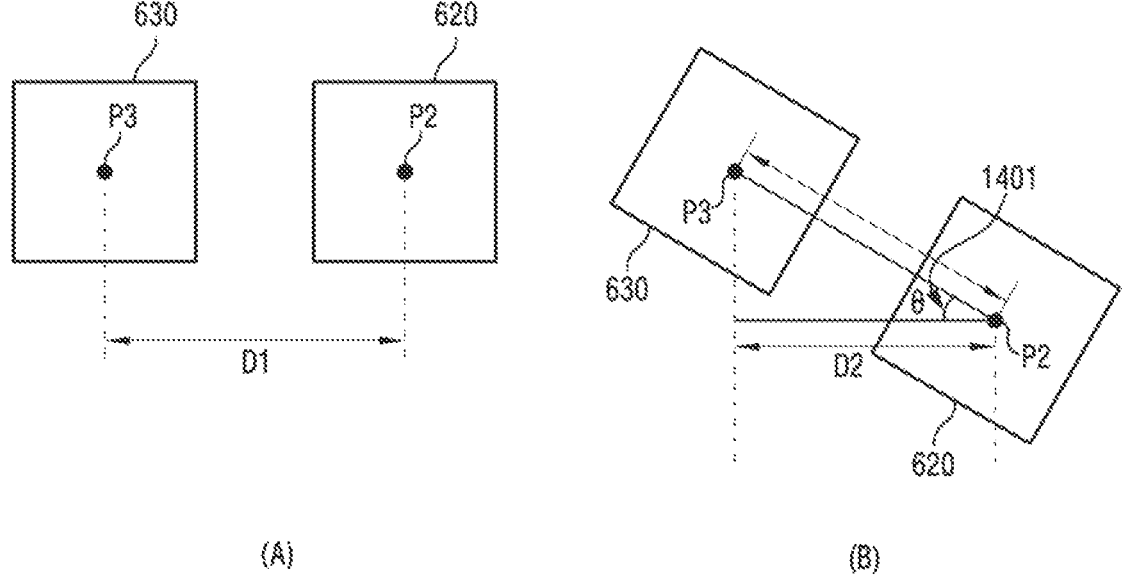
FIG. 14 illustrates an operation for identifying the separation distance between multiple antennas corresponding to a tilted posture of an electronic device according to another embodiment.

FIG. 13 illustrates a tilted posture of an electronic device according to another embodiment. FIG. 14 illustrates a scheme for identifying the separation distance between multiple antennas corresponding to a tilted posture of an electronic device according to another embodiment.

In FIGS. 13 and 14, in an embodiment, an electronic device 100 may have a first posture (A) in which the electronic device 100 is matched, at 0 degrees, with a target device (e.g., the external electronic device 200 in FIG. 4) which transmits an RF signal through a frequency band supported by a UWB communication channel. In this case, two antennas (e.g., the second antenna 620 and the third antenna 630), among multiple antennas (e.g., the first antenna 610, the second antenna 620, and the third antenna 630 in FIG. 6) included in an antenna module (e.g., the antenna module 420 in FIG. 4) of the electronic device 100, may generate a beam of a radiation pattern directed toward the target device while maintaining a separation distance "D1" (e.g., a distance (approximately 17.4 mm) between a feed point P2 of the second antenna 620 and a feed point P3 of the third antenna 630).

In one or more embodiments, the separation distance "D1" (shown in FIG. 14) may indicate a separation distance designed when the second antenna 620 and the third antenna 630 are arranged, and information about the separation distance D1 may be stored in a memory (e.g., the memory

440 in FIG. 4) of the electronic device 100. In another embodiment, the electronic device 100 may have a second posture (B) in which the electronic device 100 is tilted in a specific direction according to a user's gripping type or the type of mounting on a predetermined substrate.

For example, the electronic device 100 may have the second posture (B) in which the electronic device 100 is tilted in a third direction (e.g., the +X direction, the −X direction, the +Y direction, or the −Y direction in FIG. 1 or 2, the direction faced by the lateral member 118 in FIG. 1 or 2, or the direction faced by the third surface 110C in FIG. 1) while being not tilted in a first direction (e.g., the +Z direction in FIG. 1 or 2, the direction faced by the front plate 102 in FIG. 1, or the direction faced by the first surface 110A in FIG. 1) and a second direction (e.g., the −Z direction in FIG. 1 or 2, the direction faced by the rear plate 111 in FIG. 2, or the direction faced by the second surface 110B in FIG. 2).

According to one or more embodiments, when the electronic device 100 has the second posture (B) in which the electronic device 100 is tilted in the third direction while being not tilted in the first and second directions, the two antennas (e.g., the second antenna 620 and the third antenna 630) may have a reduced separation distance "D2" (shown in FIG. 14) compared to the separation distance D1 with respect to the same axis as in the separation distance D1 in the first posture (A) of the electronic device 100.

For example, when the electronic device 100 has the first posture (A) in which the electronic device 100 is matched with the target device at 0 degrees, the second antenna 620 and the third antenna 630 may have the separation distance D1 with respect to the X axis (e.g., the axis extending in the +X direction and the −X direction in FIG. 6), and when the electronic device 100 has the second posture (B) in which the electronic device 100 is tilted in the third direction, the second antenna 620 and the third antenna 630 may have the separation distance D2 shorter than the separation distance D1 with respect to the same X-axis.

When angle-of-arrival data of an RF signal received from the target device is calculated without considering the second posture (B) of the electronic device 100, the separation distance D1 between the multiple antennas 610, 620, and 630 in the first posture (A) of the electronic device 100 stored in the memory 440 may be used to calculate the angle-of-arrival data, and thus a deviation may occur in the calculated angle-of-arrival data.

When an RF signal is received from at least one external electronic device 200, the processor (e.g., the processor 450 of FIG. 4) of the electronic device 100 according to an embodiment may determine the posture of the electronic device 100. For example, the processor 450 may acquire, in response to the reception of the RF signal, tilt information (e.g., a tilt value) or sensing data of the electronic device 100 provided from a sensor module (e.g., the sensor module 430 in FIG. 4) according to a designated period, and may determine the posture of the electronic device 100 based on the tilt information or the sensing data.

In another example, the processor 450 may request tilt information (e.g., a tilt value) or sensing data of the electronic device 100 from the sensor module 430 in response to the reception of the RF signal, and may determine the posture of the electronic device 100 based on tilt information or sensing data of the electronic device 100 provided from the sensor module 430 in response to the request. In an embodiment, when it is determined, based on the tilt information, that the front plate 102 (or the first surface 110A in FIG. 1) of the electronic device 100 is not inclined in the first direction and that the rear plate 111 (or the second surface 110B in FIG. 2) of the electronic device 100 is not tilted in the second direction, and when it is determined that the lateral member 118 on one side of the electronic device 100 is tilted in the third direction, the processor 450 may determine that the electronic device 100 has a tilted posture in the third direction.

In one embodiment, in response to the determination of the posture of the electronic device 100 tilted in the third direction without being not tilted in the first and second directions, the processor 450 may identify a separation distance between at least two antennas used when receiving an RF signal from the at least one external electronic device 200. For example, the processor 450 may identify a separation distance (e.g., D2 shown in FIG. 14) between at least two antennas (e.g., the second antenna 620 and the third antenna 630) used at the time of reception of the RF signal by using (e.g., D1 cos θ) an angle θ 1401 indicated by the tilt information of the electronic device 100 provided from the sensor module 430 and a separation distance (e.g., D1) stored in the memory 440. In an embodiment, the processor 450 may compare the identified separation distance (e.g., D2) between the at least two antennas with the separation distance (e.g., D1) designed when the at least two antennas are arranged.

In one embodiment, when it is determined that the two compared separation distances (e.g., D1 and D2) are different from each other, the processor 450 may use the identified separation distance (e.g., D2) to acquire angle-of-arrival data of the RF signal received from the at least one external electronic device 200. For example, the processor 450 may acquire angle-of-arrival data of the RF signal by using the identified separation distance (e.g., D2) and the phase difference of RF signals received through each of the at least two antennas.

The processor 450 may determine the location of the at least one external electronic device 200 by using at least one of the angle-of-arrival data and distance data between the electronic device 100 and the at least one external electronic device 200 acquired through RF signal transmission and reception between the electronic device 100 and the at least one external electronic device 200.

Figure 15:
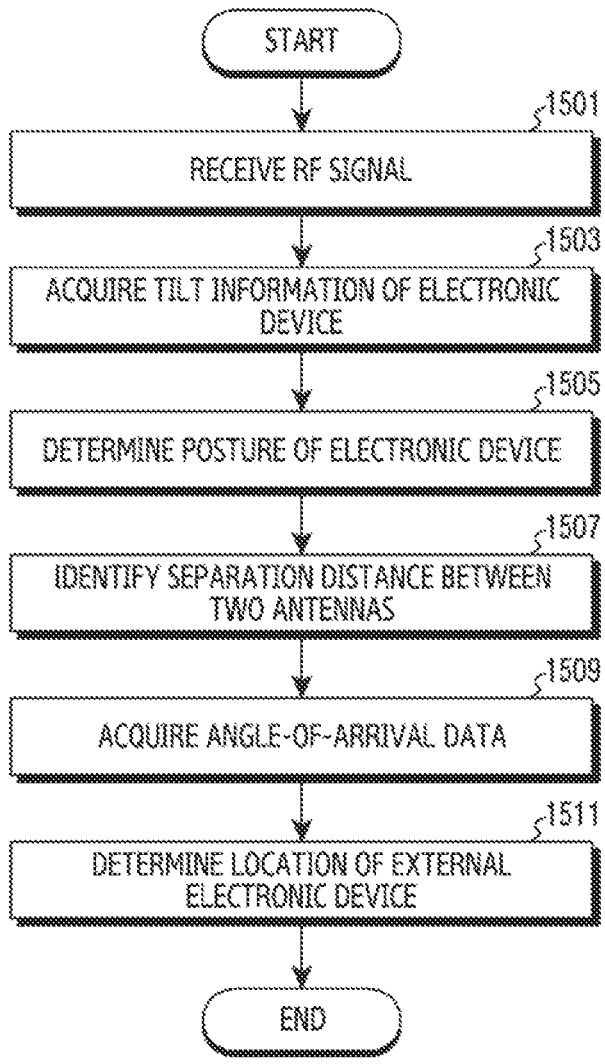
FIG. 15 illustrates an operation for acquiring angle-of-arrival data by an electronic device according to another embodiment.

FIG. 15 illustrates an operation procedure for acquiring angle-of-arrival data by an electronic device according to another embodiment. Operations described below with reference to FIG. 15 may correspond to the operations of the processor described through FIG. 13 or 14, and some redundant descriptions may be omitted.

In FIG. 15, in operation 1501, a processor (e.g., the processor 450 in FIG. 4) of an electronic device (e.g., the electronic device 100 in FIG. 4) according to an embodiment may receive an RF signal of a frequency band supported by a UWB communication channel from at least one external electronic device (e.g., the external electronic device 200 in FIG. 4). For example, the processor 450 may receive the RF signal by using at least two antennas among multiple antennas (e.g., the first antenna 610, the second antenna 620, and the third antenna 630 in FIG. 6) included in an antenna module (e.g., the antenna module 420 in FIG. 4).

According to an embodiment, in operation 1503, the processor 450 may acquire tilt information (e.g., a tilt value) of the electronic device 100 from a sensor module (e.g., the sensor module 430 of FIG. 4) in response to the reception of the RF signal. For example, the processor 450 may acquire tilt information of the electronic device 100 provided by the sensor module 430 according to a designated period, or may request and acquire tilt information of the electronic device 100 from the sensor module 430

According to an embodiment, in operation 1505, the processor 450 may determine the posture of the electronic device 100 based on the acquired tilt information of the electronic device 100. For example, when it is determined, on the tilt information of the electronic device 100 provided from the sensor module 430, that a front plate (e.g., the front plate 102 in FIG. 1) (or the first surface 110A in FIG. 1) of the electronic device 100 is not tilted in a first direction (e.g., the +Z direction in FIG. 1 or 2, the direction faced by the front plate 102 in FIG. 1, or the direction faced by the first surface 110A in FIG. 1), and that a rear plate (e.g., the rear plate 111 in FIG. 2)(or the second surface 110B in FIG. 2) of the electronic device 100 is not tilted in a second direction (e.g., the −Z direction in FIG. 1 or 2, the direction faced by the rear plate 111 in FIG. 2, or the direction faced by the second surface 110B in FIG. 2).

When it is determined that a lateral member (e.g., the lateral member 118 in FIG. 1) (or the third surface 110C in FIG. 1) on one side of the electronic device 100 is tilted in a third direction (e.g., the +X direction, the −X direction, the +Y direction, or the −Y direction in FIG. 1 or 2, the direction faced by the lateral member 118 in FIG. 1 or 2, or the direction faced by the third surface 110C in FIG. 1), the processor 450 may determine the posture of the electronic device 100 tilted in the third direction.

According to an embodiment, in operation 1507, in response to the determination of the posture of the electronic device 100 tilted in the third direction without being tilted in the first direction and the second directions, the processor 450 may identify a separation distance between the at least two antennas used when receiving an RF signal from the at least one external electronic device 200. For example, the processor 450 may identify the separation distance between the at least two antennas used at the time of the reception of the RF signal by using an angle indicated by the tilt information of the electronic device 100 provided from the sensor module 430 and a separation distance designed when the at least two antennas are arranged.

According to one embodiment, in operation 1509 and operation 1511, the processor 450 may acquire angle-of-arrival data of the RF signal by using the phase difference of RF signals received from the external electronic device 200 through each of the at least two antennas and the identified separation distance between the at least two antennas, and may determine the location of the at least one external electronic device 200 by using at least one of and the angle-of-arrival data and distance data between the electronic device 100 and the at least one external electronic device 200.

According to one or more embodiments described above, an electronic device may include a housing which includes a first surface facing a first direction, a second surface facing a second direction opposite to the first direction, and a third surface facing a third direction perpendicular to the first direction or the second direction and surrounding a space between the first surface and the second surface, a sensor module disposed in the inner space of the housing, a memory disposed in the inner space of the housing, multiple antennas disposed in the inner space of the housing, a wireless communication module disposed in the inner space of the housing and electrically connected to the multiple antennas to support ultra-wideband communication, and a processor electrically connected to the sensor module, the memory, the multiple antennas, and the wireless communication module.

According to one or more embodiments, the processor may receive an RF signal of a designated frequency band from an external electronic device by using at least two antennas among the multiple antennas, may acquire first angle-of-arrival data of the RF signal, based on at least a part of the RF signal, may determine the posture of the electronic device based on tilt information of the electronic device provided from the sensor module, may identify a compensation value corresponding to tilt information of the electronic device stored in the memory when the electronic device is determined to be tilted in the first direction or the second direction, may acquire second angle-of-arrival data by applying the compensation value to the first angle-of-arrival data, and may determine the location of the external electronic device based on the second angle-of-arrival data.

According to one or more embodiments, the processor may further determine, as at least part of the determining of the posture of the electronic device, a posture in which the electronic device is not tilted in the third direction.

According to one or more embodiments, the processor may map and store, in the memory, multiple pieces of tilt information of the electronic device tilted in the first direction or the second direction and multiple compensation values corresponding to the multiple pieces of tilt information, respectively.

According to one or more embodiments, the processor may identify, when the tilt information of the electronic device indicates a first angle, a first compensation value stored in the memory and corresponding to the first angle, and may identify, when the tilt information of the electronic device indicates a second angle different from the first angle, a second compensation value stored in the memory and corresponding to the second angle.

According to one or more embodiments, the processor may sum the first angle-of-arrival data and the compensation value as at least part of the applying of the compensation value to the first angle-of-arrival data.

According to one or more embodiments, the processor may determine the posture of the electronic device based on a portrait mode of the electronic device.

According to one or more embodiments, the sensor module may include a six (6)-axis sensor.

An electronic device according to one or more embodiments described above may include a housing which includes a first surface facing a first direction, a second surface facing a second direction opposite to the first direction, and a third surface facing a third direction perpendicular to the first direction or the second direction and surrounding a space between the first surface and the second surface, a sensor module disposed in the inner space of the housing, a memory disposed in the inner space of the housing, multiple antennas disposed in the inner space of the housing, a wireless communication module disposed in the inner space of the housing and electrically connected to the multiple antennas to support ultra-wideband communication, and a processor electrically connected to the sensor module, the memory, the multiple antennas, and the wireless communication module.

According to one or more embodiments, the processor may receive an RF signal of a designated frequency band from an external electronic device by using at least two antennas among the multiple antennas, may determine the posture of the electronic device based on tilt information of the electronic device provided from the sensor module, may identify a first separation distance between the at least two antennas when the electronic device is determined to be tilted in the third direction, may acquire angle-of-arrival data of the RF signal based on at least a part of the first separation distance and the RF signal, and may determine the location of the external electronic device based on the angle-of-arrival data.

According to one or more embodiments, the processor may further determine, as at least part of the determining of the posture of the electronic device, a posture in which the electronic device is not tilted in the first direction and the second direction.

According to one or more embodiments, the processor may identify a second separation distance between the at least two antennas in a posture in which the electronic device is not tilted in the third direction, and may compare the second separation distance and the first separation distance.

According to one or more embodiments, the processor may acquire angle-of-arrival data of the RF signal when the second separation distance and the first separation distance are determined to be different from each other based on the comparison.

According to one or more embodiments, the processor may identify the first separation distance by using the second separation distance and an angle indicated by the tilt information of the electronic device.

According to one or more embodiments, the processor may determine the posture of the electronic device based on a portrait mode of the electronic device.

According to one or more embodiments, the sensor module may include a six (6)-axis sensor.

An operation for acquiring angle-of-arrival data by an electronic device according to one or more embodiments described above may include receiving an RF signal of a designated frequency band from an external electronic device by using at least two antennas among multiple antennas, acquiring first angle-of-arrival data of the RF signal, based on at least a part of the RF signal, determining the posture of the electronic device based on tilt information of the electronic device provided from a sensor module, identifying a compensation value corresponding to tilt information of the electronic device stored in a memory in response to determining that the electronic device is tilted in a first direction faced by a front surface of the electronic device or a second direction faced by a rear surface of the electronic device, acquiring second angle-of-arrival data by applying the compensation value to the first angle-of-arrival data, and determining the location of the external electronic device based on the second angle-of-arrival data.

According to one or more embodiments, the determining of the posture of the electronic device may include determining a posture in which the electronic device is not tilted in a third direction perpendicular to the first direction or the second direction.

According to one or more embodiments, the angle-of-arrival data acquisition method may further include mapping and storing, in the memory, multiple pieces of tilt information of the electronic device tilted in the first direction or the second direction and multiple compensation values corresponding to the multiple pieces of tilt information, respectively.

According to one or more embodiments, the determining of the compensation value corresponding to the tilt information of the electronic device may include identifying, when the tilt information of the electronic device indicates a first angle, a first compensation value stored in the memory and corresponding to the first angle, and identifying, when the tilt information of the electronic device indicates a second angle different from the first angle, a second compensation value stored in the memory and corresponding to the second angle.

According to one or more embodiments, the acquiring of the second angle-of-arrival data may include acquiring the second angle-of-arrival data by summing the first angle-of-arrival data and the compensation value.

According to one or more embodiments, the determining of the posture of the electronic device may include determining the posture of the electronic device based on a portrait mode of the electronic device.

FIG. 16 is a block diagram illustrating an electronic device 1601 in a network environment 1600 according to various embodiments.

Referring to FIG. 16, the electronic device 1601 in the network environment 1600 may communicate with an electronic device 1602 via a first network 1698 (e.g., a short-range wireless communication network), or at least one of an electronic device 1604 or a server 1608 via a second network 1699 (e.g., a long-range wireless communication network). According to an embodiment, the electronic device 1601 may communicate with the electronic device 1604 via the server 1608. According to an embodiment, the electronic device 1601 may include a processor 1620, memory 1630, an input module 1650, a sound output module 1655, a display module 1660, an audio module 1670, a sensor module 1676, an interface 1677, a connecting terminal 1678, a haptic module 1679, a camera module 1680, a power management module 1688, a battery 1689, a communication module 1690, a subscriber identification module (SIM) 1696, or an antenna module 1697. In some embodiments, at least one of the components (e.g., the connecting terminal 1678) may be omitted from the electronic device 1601, or one or more other components may be added in the electronic device 1601. In some embodiments, some of the components (e.g., the sensor module 1676, the camera module 1680, or the antenna module 1697) may be implemented as a single component (e.g., the display module 1660).

The processor 1620 may execute, for example, software (e.g., a program 1640) to control at least one other component (e.g., a hardware or software component) of the electronic device 1601 coupled with the processor 1620, and may perform various data processing or computation. According to one embodiment, as at least part of the data processing or computation, the processor 1620 may store a command or data received from another component (e.g., the sensor module 1676 or the communication module 1690) in volatile memory 1632, process the command or the data stored in the volatile memory 1632, and store resulting data in non-volatile memory 1634. According to an embodiment, the processor 1620 may include a main processor 1621 (e.g., a central processing unit (CPU) or an application processor (AP)), or an auxiliary processor 1623 (e.g., a graphics processing unit (GPU), a neural processing unit (NPU), an image signal processor (ISP), a sensor hub processor, or a communication processor (CP)) that is operable independently from, or in conjunction with, the main processor 1621. For example, when the electronic device 1601 includes the main processor 1621 and the auxiliary processor 1623, the auxiliary processor 1623 may be adapted to consume less power than the main processor 1621, or to be specific to a specified function. The auxiliary processor 1623 may be implemented as separate from, or as part of the main processor 1621.

The auxiliary processor 1623 may control at least some of functions or states related to at least one component (e.g., the display module 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). According to an embodiment, the auxiliary processor 1623 (e.g., an image signal processor or a communication processor) may be implemented as part of another component (e.g., the camera module 1680 or the communication module 1690) functionally related to the auxiliary processor 1623. According to an embodiment, the auxiliary processor 1623 (e.g., the neural processing unit) may include a hardware structure specified for artificial intelligence model processing. An artificial intelligence model may be generated by machine learning. Such learning may be performed, e.g., by the electronic device 1601 where the artificial intelligence is performed or via a separate server (e.g., the server 1608). Learning algorithms may include, but are not limited to, e.g., supervised learning, unsupervised learning, semi-supervised learning, or reinforcement learning. The artificial intelligence model may include a plurality of artificial neural network layers. The artificial neural network may be a Deep Neural Network (DNN), a Convolutional Neural Network (CNN), a Recurrent Neural Network (RNN), a Restricted Boltzmann Machine (RBM), a Deep Belief Network (DBN), a Bidirectional Recurrent Deep Neural Network (BRDNN), deep Q-network or a combination of two or more thereof but is not limited thereto. The artificial intelligence model may, additionally or alternatively, include a software structure other than the hardware structure.

The memory 1630 may store various data used by at least one component (e.g., the processor 1620 or the sensor module 1676) of the electronic device 1601. The various data may include, for example, software (e.g., the program 1640) and input data or output data for a command related thererto. The memory 1630 may include the volatile memory 1632 or the non-volatile memory 1634.

The program 1640 may be stored in the memory 1630 as software, and may include, for example, an operating system (OS) 1642, middleware 1644, or an application 1646.

The input module 1650 may receive a command or data to be used by another component (e.g., the processor 1620) of the electronic device 1601, from the outside (e.g., a user) of the electronic device 1601. The input module 1650 may include, for example, a microphone, a mouse, a keyboard, a key (e.g., a button), or a digital pen (e.g., a stylus pen).

The sound output module 1655 may output sound signals to the outside of the electronic device 1601. The sound output module 1655 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1660 may visually provide information to the outside (e.g., a user) of the electronic device 1601. The display module 1660 may include, for example, a display, a hologram device, or a projector and control circuitry to control a corresponding one of the display, hologram device, and projector. According to an embodiment, the display module 1660 may include a touch sensor adapted to detect a touch, or a pressure sensor adapted to measure the intensity of force incurred by the touch.

The audio module 1670 may convert a sound into an electrical signal and vice versa. According to an embodiment, the audio module 1670 may obtain the sound via the input module 1650, or output the sound via the sound output module 1655 or a headphone of an external electronic device (e.g., an electronic device 1602) directly (e.g., wiredly) or wirelessly coupled with the electronic device 1601.

The sensor module 1676 may detect an operational state (e.g., power or temperature) of the electronic device 1601 or an environmental state (e.g., a state of a user) external to the electronic device 1601, and then generate an electrical signal or data value corresponding to the detected state. According to an embodiment, the sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device (e.g., the electronic device 1602) directly (e.g., wiredly) or wirelessly. According to an embodiment, the interface 1677 may include, for example, a high definition multimedia interface (HDMI), a universal serial bus (USB) interface, a secure digital (SD) card interface, or an audio interface.

A connecting terminal 1678 may include a connector via which the electronic device 1601 may be physically connected with the external electronic device (e.g., the electronic device 1602). According to an embodiment, the connecting terminal 1678 may include, for example, a HDMI connector, a USB connector, a SD card connector, or an audio connector (e.g., a headphone connector).

The haptic module 1679 may convert an electrical signal into a mechanical stimulus (e.g., a vibration or a movement) or electrical stimulus which may be recognized by a user via his tactile sensation or kinesthetic sensation. According to an embodiment, the haptic module 1679 may include, for example, a motor, a piezoelectric element, or an electric stimulator.

The camera module 1680 may capture a still image or moving images. According to an embodiment, the camera module 1680 may include one or more lenses, image sensors, image signal processors, or flashes.

The power management module 1688 may manage power supplied to the electronic device 1601. According to one embodiment, the power management module 1688 may be implemented as at least part of, for example, a power management integrated circuit (PMIC).

The battery 1689 may supply power to at least one component of the electronic device 1601. According to an embodiment, the battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently from the processor 1620 (e.g., the application processor (AP)) and supports a direct (e.g., wired) communication or a wireless communication. According to an embodiment, the communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device via the first network 1698 (e.g., a short-range communication network, such as Bluetooth™, Wireless-Fidelity (Wi-Fi) direct, or Infrared Data Association (IrDA)) or the second network 1699 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1692 may identify and authenticate the electronic device 1601 in a communication network, such as the first network 1698 or the second network 1699, using subscriber information (e.g., international mobile subscriber identity (IMSI)) stored in the subscriber identification module 1696.

The wireless communication module 1692 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1692 may support a high-frequency band (e.g., the mmWave band) to achieve, e.g., a high data transmission rate. The wireless communication module 1692 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1692 may support various requirements specified in the electronic device 1601, an external electronic device (e.g., the electronic device 1604), or a network system (e.g., the second network 1699). According to an embodiment, the wireless communication module 1692 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1697 may transmit or receive a signal or power to or from the outside (e.g., the external electronic device) of the electronic device 1601. According to an embodiment, the antenna module 1697 may include an antenna including a radiating element composed of a conductive material or a conductive pattern formed in or on a substrate (e.g., a printed circuit board (PCB)). According to an embodiment, the antenna module 1697 may include a plurality of antennas (e.g., array antennas). In such a case, at least one antenna appropriate for a communication scheme used in the communication network, such as the first network 1698 or the second network 1699, may be selected, for example, by the communication module 1690 (e.g., the wireless communication module 1692) from the plurality of antennas. The signal or the power may then be transmitted or received between the communication module 1690 and the external electronic device via the selected at least one antenna. According to an embodiment, another component (e.g., a radio frequency integrated circuit (RFIC)) other than the radiating element may be additionally formed as part of the antenna module 1697.

According to various embodiments, the antenna module 1697 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, General Purpose Input And Output (GPIO), Serial Peripheral Interface (SPI), or Mobile Industry Processor Interface (MIPI)).

According to an embodiment, commands or data may be transmitted or received between the electronic device 1601 and the external electronic device 1604 via the server 1608 coupled with the second network 1699. Each of the electronic devices 1602 or 1604 may be a device of a same type as, or a different type, from the electronic device 1601. According to an embodiment, all or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, mobile edge computing (MEC), or client-server computing technology may be used, for example. The electronic device 1601 may provide ultra-low-latency services using, e.g., distributed computing or mobile edge computing. In another embodiment, the external electronic device 1604 may include an internet-of-things (IoT) device. The server 1608 may be an intelligent server using machine learning and/or a neural network. According to an embodiment, the external electronic device 1604 or the server 1608 may be included in the second network 1699. The electronic device 1601 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1640) including one or more instructions that are stored in a storage medium (e.g., internal memory 1636 or external memory 1638) that is readable by a machine (e.g., the electronic device 1601). For example, a processor (e.g., the processor 1620) of the machine (e.g., the electronic device 1601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a housing that comprises a first surface facing a first direction, a second surface facing a second direction opposite to the first direction, and a third surface facing a third direction perpendicular to the first direction or the second direction and surrounding a space between the first surface and the second surface;

a sensor module disposed in an inner space of the housing;

a memory disposed in the inner space of the housing;

multiple antennas disposed in the inner space of the housing;

a wireless communication module disposed in the inner space of the housing and electrically connected to the multiple antennas; and a processor electrically connected to the sensor module, the memory, the multiple antennas, and the wireless communication module, wherein the processor is configured to:

receive a Radio Frequency (RF) signal of a designated frequency band from an external electronic device by using at least two antennas among the multiple antennas;

acquire first angle-of-arrival data of the RF signal, based on at least a part of the RF signal;

determine a posture of the electronic device based on tilt information of the electronic device provided from the sensor module;

based on the electronic device that is determined to be tilted in the first direction or the second direction:

identify a compensation value corresponding to tilt information of the electronic device, the compensation value being stored in the memory;

acquire second angle-of-arrival data by applying the compensation value to the first angle-of-arrival data; and determine a location of the external electronic device based on the second angle-of-arrival data.

2. The electronic device of claim 1, wherein the processor is configured to further determine, as at least part of the determining of the posture of the electronic device, a posture in which the electronic device is not tilted in the third direction.

3. The electronic device of claim 1, wherein the processor is further configured to map and store, in the memory, (i) multiple pieces of tilt information of the electronic device tilted in the first direction or the second direction and (ii) multiple compensation values corresponding to the multiple pieces of tilt information.

4. The electronic device of claim 1, wherein the processor is further configured to map and store, in the memory, (i) a group of multiple pieces of tilt information of the electronic device tilted in the first direction or the second direction and (ii) a compensation value corresponding to the group of the multiple pieces of tilt information.

5. The electronic device of claim 1, wherein the processor is further configured to:

identify, based on the tilt information indicating a first angle, a first compensation value stored in the memory and corresponding to the first angle; and identify, based on the tilt information indicating a second angle different from the first angle, a second compensation value stored in the memory and corresponding to the second angle.

6. The electronic device of claim 1, wherein the processor is further configured to sum the first angle-of-arrival data and the compensation value as at least part of the applying of the compensation value to the first angle-of-arrival data.

7. The electronic device of claim 1, wherein the processor is further configured to determine the posture of the electronic device based on a portrait mode of the electronic device.

8. The electronic device of claim 1, wherein the sensor module comprises a six axis sensor.

9. A method for acquiring angle-of-arrival data by an electronic device, the method comprising:

receiving, by a wireless communication module of the electronic device, a Radio Frequency (RF) signal of a designated frequency band from an external electronic device by using at least two antennas among multiple antennas electrically connected to the wireless communication module;

acquiring, by a processor of the electronic device, the processor being electrically connected to the wireless communication module, first angle-of-arrival data of the RF signal, based on at least a part of the RF signal;

determining, by the processor, a posture of the electronic device based on tilt information of the electronic device provided from a sensor module of the electronic device;

identifying, by the processor, a compensation value corresponding to the tilt information of the electronic device in response to determining that the electronic device is tilted in a first direction faced by a front surface of a housing of the electronic device or a second direction faced by a rear surface of the housing of the electronic device, the compensation value being stored in a memory of the electronic device;

acquiring, by the processor, second angle-of-arrival data by applying the compensation value to the first angle-of-arrival data; and determining, by the processor, a location of the external electronic device based on the acquired second angle-of-arrival data.

10. The method of claim 9, wherein the housing further comprises a third surface facing a third direction and surrounding a space between the first surface and the second surface, and wherein the determining of the posture of the electronic device comprises determining a posture in which the electronic device is not tilted in a third direction perpendicular to the first direction or the second direction.

11. The method of claim 9, further comprising mapping and storing, in the memory, (i) multiple pieces of tilt information of the electronic device tilted in the first direction or the second direction and (ii) multiple compensation values corresponding to the multiple pieces of tilt information.

12. The method of claim 9, wherein the determining of the compensation value corresponding to the tilt information of the electronic device comprises:

identifying, based on the tilt information indicating a first angle, a first compensation value stored in the memory and corresponding to the first angle; and identifying, based on the tilt information indicating a second angle different from the first angle, a second compensation value stored in the memory and corresponding to the second angle.

13. The method of claim 9, wherein the acquiring of the second angle-of-arrival data comprises acquiring the second angle-of-arrival data by summing the first angle-of-arrival data and the compensation value.

14. The method of claim 9, wherein the determining of the posture of the electronic device comprises determining the posture of the electronic device based on a portrait mode of the electronic device.

15. The method of claim 9, wherein the sensor module comprises a six axis sensor.

16. An electronic device comprising:

a housing comprising a first surface facing a first direction, a second surface facing a second direction opposite to the first direction, and a third surface facing a third direction perpendicular to the first direction or the second direction and surrounding a space between the first surface and the second surface;

a sensor module disposed in an inner space of the housing;

a memory disposed in the inner space of the housing;

multiple antennas disposed in the inner space of the housing;

a wireless communication module disposed in the inner space of the housing and electrically connected to the multiple antennas; and a processor electrically connected to the sensor module, the memory, the multiple antennas, and the wireless communication module, wherein the processor is configured to:

receive a Radio Frequency (RF) signal of a designated frequency band from an external electronic device by using at least two antennas among the multiple antennas;

determine a posture of the electronic device based on tilt information of the electronic device provided from the sensor module;

based on the electronic device that is determined to be tilted in the third direction, identify a first separation distance between the at least two antennas acquire angle-of-arrival data of the RF signal based on at least a part of the first separation distance and the RF signal, determine a location of the external electronic device based on the angle-of-arrival data.

17. The electronic device of claim 16, wherein the processor is further configured to further determine, as at least part of the determining of the posture of the electronic device, a posture in which the electronic device is not tilted in the first direction and the second direction.

18. The electronic device of claim 16, wherein the processor is further configured to:

identify a second separation distance between the at least two antennas in a posture in which the electronic device is not tilted in the third direction, and compare the second separation distance and the first separation distance.

19. The electronic device of claim 18, wherein the processor is further configured to acquire angle-of-arrival data of the RF signal when the second separation distance and the first separation distance are determined to be different from each other based on the comparison.

20. The electronic device of claim 18, wherein the processor is further configured to identify the first separation distance by using the second separation distance and an angle indicated by the tilt information of the electronic device.

* * * * *